United States Patent
Engel et al.

(10) Patent No.: US 11,381,611 B2
(45) Date of Patent: *Jul. 5, 2022

(54) MANAGING ENGAGEMENTS IN INTERACTIVE MULTIMEDIA SESSIONS

(71) Applicant: Fanmio Inc., Fort Lauderdale, FL (US)

(72) Inventors: Solomon Engel, Fort Lauderdale, FL (US); Aaron Ross Anderson, Hillsdale, MI (US); Christian Marcello Gambardella, Berlin (DE)

(73) Assignee: Fanmio, Inc., Fort Lauderdale, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/314,125

(22) Filed: May 7, 2021

(65) Prior Publication Data

US 2021/0266351 A1    Aug. 26, 2021

Related U.S. Application Data

(63) Continuation of application No. 16/751,835, filed on Jan. 24, 2020, now Pat. No. 11,032,329.

(51) Int. Cl.
| | |
|---|---|
| *H04L 29/06* | (2006.01) |
| *G06F 3/0484* | (2022.01) |
| *H04L 12/861* | (2013.01) |
| *H04L 65/1069* | (2022.01) |
| *H04L 65/403* | (2022.01) |
| *H04L 65/60* | (2022.01) |
| *G06F 3/04847* | (2022.01) |
| *H04L 49/90* | (2022.01) |
| *G06F 3/0482* | (2013.01) |
| *H04L 65/4038* | (2022.01) |

(52) U.S. Cl.
CPC ........ *H04L 65/1069* (2013.01); *G06F 3/0482* (2013.01); *G06F 3/04847* (2013.01); *H04L 49/90* (2013.01); *H04L 65/403* (2013.01); *H04L 65/4038* (2013.01); *H04L 65/60* (2013.01)

(58) Field of Classification Search
CPC ... G06F 3/0482; H04L 49/90; H04L 65/4038; H04L 65/60
See application file for complete search history.

(56) References Cited

U.S. PATENT DOCUMENTS

| | | | |
|---|---|---|---|
| 2009/0220064 A1* | 9/2009 | Gorti | H04M 3/568 379/202.01 |
| 2015/0200982 A1* | 7/2015 | Velagaleti | H04L 65/1069 715/753 |

(Continued)

*Primary Examiner* — Tadesse Hailu
(74) *Attorney, Agent, or Firm* — GS2Law LLP

(57) ABSTRACT

Introduced here are session management platforms able to facilitate multimedia sessions that involve host(s) and user (s). A session management platform may enable multimedia communication between the host(s) and a participating user. The users may be added into positions in a priority queue, where the priority queue may represent an order of users to be used to select a given user for participation in the multimedia session. Upon termination of a session between the host(s) and a first participating user, the priority queue may be updated to remove the first participating user from the queue and a second participating user is selected. The multimedia session may enable multimedia communication between the host(s) and the second participating user based on the second participating user being selected.

5 Claims, 25 Drawing Sheets

(56) References Cited

U.S. PATENT DOCUMENTS

| | | | |
|---|---|---|---|
| 2015/0304376 A1* | 10/2015 | Gottlieb | H04N 7/15 |
| | | | 715/719 |
| 2016/0285921 A1* | 9/2016 | Savostiyanov | H04L 65/1093 |
| 2018/0205797 A1* | 7/2018 | Faulkner | H04L 65/403 |
| 2018/0255114 A1* | 9/2018 | Dharmaji | G06Q 50/01 |
| 2018/0351756 A1* | 12/2018 | Dave | H04N 7/15 |
| 2020/0016495 A1* | 1/2020 | Cruz | A63F 13/795 |

* cited by examiner

MANAGING ENGAGEMENTS IN INTERACTIVE MULTIMEDIA SESSIONS

CROSS-REFERENCE TO RELATED APPLICATIONS

This application claims priority to U.S. Provisional Application No. 62/798,173, titled "Managing Engagements in Interactive Multimedia Sessions" and filed on Jan. 29, 2019, which is incorporated by reference herein in its entirety.

TECHNICAL FIELD

Various embodiments concern computer programs and associated computer-implemented techniques for facilitating, managing, and/or engaging in interactive multimedia sessions.

BACKGROUND

Social interactions between multiple individuals can, and often does, improve the relationship between those individuals. In fact, social relationships are often strongest between those individuals who interact with one another the most (e.g., family members and friends).

Social relationships may be central to the success of certain individuals. For example, popular individuals who have attained success in sports, entertainment, or business (also referred to as "celebrities") may be paid more for having a significant number of followers on social media services or a large number of fans in a particular marketing segment. However, facilitating interactions between celebrities and their fans is difficult for a variety of reasons.

Some celebrities interact with fans via social media services, such as Facebook Live™. For example, a celebrity may announce to fans that she will be involved in an interactive session at given date and time. Once the interactive session begins, the celebrity can ask the fans to submit questions, some of which may be answered. Hundreds of questions may be submitted by the fans, and the celebrity (or another individual such as a manager) will normally select several questions to answer. However, the celebrity does not have time to properly screen the questions submitted by fans over the course of the interactive session. Instead, the celebrity will simply select questions—usually in an ad hoc manner—as those questions are presented on the screen (e.g., within a comments section). Such an approach prevents meaningful back-and-forth interactions between the celebrity and fans from occurring.

BRIEF DESCRIPTION OF THE DRAWINGS

Various features of the technology will become more apparent to those skilled in the art from a study of the Detailed Description in conjunction with the drawings. Embodiments of the technology are illustrated by way of example and not limitation in the drawings, in which like references may indicate similar elements.

Figure 1:
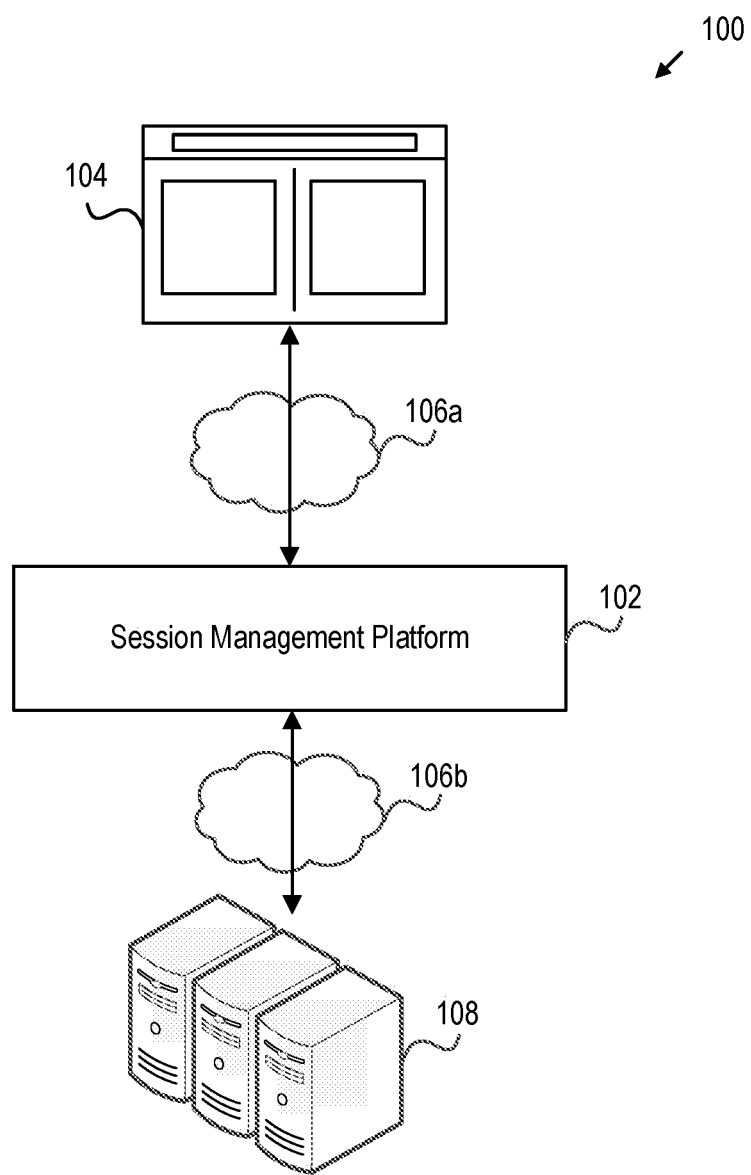
FIG. 1 illustrates a network environment that includes a session management platform, in accordance with various embodiments.

The drawings depict various embodiments for the purpose of illustration only. Those skilled in the art will recognize that alternative embodiments may be employed without departing from the principles of the technology. Accordingly, while specific embodiments are shown in the drawings, the technology is amenable to various modifications.

DETAILED DESCRIPTION

In large-scale interactive sessions, it can be difficult to manage interactions between multiple individuals in real time. An interactive session will typically be managed by one individual (referred to as a "host") who engages with one or more other individuals (referred to as "participants") throughout the interactive session. Note that some interactive sessions are able to accommodate individuals who are interested in observing rather than participating. These individuals may be referred to as "observers" or "passive participants." A host may be, for example, a celebrity (e.g., an athlete, actor, entertainer, or influencer), and the participants and observers may be fans of the celebrity. Introduced here are technologies for improving how engagements between the host and participant(s) are managed.

For example, a session management platform may be configured to implement a handshake process in which parties confirm their readiness to initiate an exchange (also referred to as an "engagement") as part of an interactive session. Initially, participant(s) in an interactive session may be placed in a queue that is visible to the host. When the host is ready to conduct the interactive session, the host can ask each participant whether she is ready by selecting a digital element featured alongside information about each participant (e.g., name, age, connectivity status). Such action will prompt the generation of a notification that asks the participant whether she is ready to begin the exchange.

If the session management platform receives input indicative of a response that the participant is ready, then the session management platform can initiate the exchange. For example, the session management platform may cause an electronic device associated with the participant to begin capturing digital media (e.g., audio and/or video) and then share the digital media with other individuals involved in the interactive session. Thus, the digital media could be streamed to an electronic device associated with the host and electronic device(s) associated with other participant(s)/observer(s) in the interactive session.

However, if the session management platform receives input indicative of a response that the participant is not ready (or no input at all), then the session management platform can shift the participant downward in the queue. Accordingly, the session management platform can ensure that the host consistently interacts with ready/responsive participants.

In some embodiments, the host may be permitted to "peek" at a given participant to ensure that precautionary policies are met. For example, if the session management platform is configured to handle video, the host may choose to peek at the video stream of a given participant to ensure that inappropriate content will not be shown. Alternatively, this may be done by another individual (referred to as a "managing observer" or "manager") in real time as the host conducts an interactive session.

Embodiments may be described in the context of a single host for the purpose of illustration. However, those skilled in the art will recognize that an interactive session could involve multiple hosts. For example, an interactive session could involve a celebrity and her manager, who helps moderate the interactive session. As another example, an interactive session could involve multiple celebrities from related fields (e.g., two athletes from the same sport or different sports). Moreover, embodiments may be described in the context of a single participant for the purpose of illustration. However, those skilled in the art will recognize that an interactive session could involve one or more participants while being observed by potential participant(s), observer(s), etc.

While embodiments may be described in the context of multimedia sessions, those skilled in the art will recognize that an interactive session could involve the exchange of audio, video, images, text, metadata, or any combination thereof between multiple parties in a coordinated fashion. Thus, in some embodiments the session management platform may be designed to handle audio data (also referred to as "voice data"), while in other embodiments the session management platform may be designed to handle audio and video data.

Embodiments may be described with reference to particular computer programs, system configurations, networks, etc. However, those skilled in the art will recognize that these features are equally applicable to other computer program types, system configurations, network types, etc. For example, although the term "mobile application" may be used to describe a computer program, the relevant feature may be embodied in another type of computer program.

Moreover, the technology can be embodied using special-purpose hardware (e.g., circuitry), programmable circuitry appropriately programmed with software and/or firmware, or a combination of special-purpose hardware and programmable circuitry. Accordingly, embodiments may include a machine-readable medium having instructions that may be used to program a computing device to perform a process for implementing a handshake process in which parties confirm their readiness to participant in an interactive session.

Terminology

References in this description to "an embodiment" or "one embodiment" means that the particular feature, function, structure, or characteristic being described is included in at least one embodiment. Occurrences of such phrases do not necessarily refer to the same embodiment, nor are they necessarily referring to alternative embodiments that are mutually exclusive of one another.

The terms "connected," "coupled," or any variant thereof is intended to include any connection or coupling between two or more elements, either direct or indirect. The coupling/connection can be physical, logical, or a combination thereof. For example, devices may be electrically or communicatively coupled to one another despite not sharing a physical connection.

The term "based on" is also to be construed in an inclusive sense rather than an exclusive or exhaustive sense. Thus, unless otherwise noted, the term "based on" is intended to mean "based at least in part on."

When used in reference to a list of multiple items, the word "or" is intended to cover all of the following interpretations: any of the items in the list, all of the items in the list, and any combination of items in the list.

The term "green room," as used herein, refers to a network-accessible area where host(s) and managing observer(s) can communicate (e.g., via text, audio, or video) before, during, or after an interactive session.

The term "waiting room," as used herein, refers to a network-accessible area where participant(s) can wait until an interactive session begins.

The term "handshake," as used herein, refers an exchange between multiple parties in which these parties confirm their readiness to initiate an interactive session in accordance with a communication protocol. The confirmation may be based on input received from the parties (e.g., based on a selection of a digital element shown on an interface), the electronic devices associated with the parties, etc.

The term "peek," as used herein, refers to the ability of a host or a managing observer to view the live media feed of a participant before her interactive session with the host begins.

The sequences of steps performed in any of the processes described here are exemplary. However, unless contrary to physical possibility, the steps may be performed in various sequences and combinations. For example, steps could be added to, or removed from, the processes described here. Similarly, steps could be replaced or reordered. Thus, descriptions of any processes are intended to be open-ended.

Technology Overview

FIG. 1 illustrates a network environment 100 that includes a session management platform 102, in accordance with various embodiments. Individuals can interface with the session management platform 102 via an interface 104. However, the session management platform 102 may be configured to generate different interface(s) depending on the type of individual attempting to interface with the session management platform 102. For example, responsive to determining that a host is attempting to schedule/initiate/conduct an interactive session, the session management platform 102 may generate a first interface (also referred to as a "host-facing interface"). Responsive to determining that a participant is attempting to browse/attend an interactive session, the session management platform 102 may generate a second interface (also referred to as a "participant-facing interface"). As further described below, the first and second interfaces may have different features.

The session management platform 102 may be responsible for handling digital media captured during an interactive session. The digital media may include one or more streams (also referred to as "flows"). Assume, for example, that an interactive session involves a host and multiple potential participants. Digital media captured by the electronic device of the host can be forwarded (e.g., following analysis, processing, etc.) to the electronic devices of the potential participants. Moreover, during the interactive session, the host may select a given participant to participate in an engagement. For instance, the host may have approved a question submitted by the given participant. In such instances, the session management platform 102 can forward (e.g., following analysis, processing, etc.) digital media captured by the electronic device of the given participant to the electronic device of the host and the electronic device(s) of the other potential participant(s). The session management platform 102 may also be responsible for creating interfaces through which the individual can view digital media (e.g., live interactive sessions, recorded interactive sessions), provide feedback (e.g., via feedback forms), message other individuals (e.g., regarding an interactive session, celebrity, etc.), input personal/financial information (e.g., as part of a registration process), manage preferences, etc.

Some interfaces are configured to facilitate interactions between hosts and participants, while other interfaces are configured to serve as informative dashboards for either hosts or participants. For example, when a host accesses the session management platform 102, she may have access to an interface for hosting an interactive session, an interface for scheduling an interface session, an interface for uploading relevant information (e.g., links to social media services, information about upcoming games/tours/events, etc.), etc. As another example, when a participant accesses the session management platform 102, she may have access to an interface for participating in an interactive session, an interface for browsing interactive sessions associated with different celebrities, an interface for indicating a desire to attend an interactive session, an interface for uploading relevant information (e.g., personal information such as name, age, and location, or financial information such as credit card number, billing address, and expiration date), etc.

As noted above, the session management platform 102 may reside in a network environment 100. Thus, the session management platform 102 may be connected to one or more networks 106a-b. The network(s) 106a-b can include personal area networks (PANs), local area networks (LANs), wide area networks (WANs), metropolitan area networks (MANs), cellular networks, the Internet, etc. Additionally or alternatively, the session management platform 102 can be communicatively coupled to electronic device(s) over a short-range communication protocol, such as Bluetooth® or Near Field Communication (NFC).

The interface 104 is preferably accessible via a web browser, desktop application, mobile application, or over-the-top (OTT) application. Accordingly, the interface 104 may be viewed on a personal computer, tablet computer, personal digital assistant (PDA), mobile phone, game console, music player, wearable electronic device (e.g., a watch or fitness accessory), network-connected ("smart") electronic device, (e.g., a television or home assistant device), virtual/augmented reality system (e.g., a head-mounted display), or some other electronic device.

Some embodiments of the session management platform 102 are hosted locally. That is, the session management platform 102 may reside on the electronic device used to access the interface 104. For example, the session management platform 102 may be embodied as a mobile application executing on a mobile phone. Thus, each host and participant may have a separate instance of the session management platform 102 executing on a corresponding electronic device.

Other embodiments of the session management platform 102 are executed by a cloud computing service operated by Amazon Web Services® (AWS), Google Cloud Platform™, Microsoft Azure®, or a similar technology. In such embodiments, the session management platform 102 may reside on a host computer server that is communicatively coupled to one or more content computer servers 108. The content computer server(s) 108 can include media content (e.g., recorded interactive sessions, advertisements, banners related to upcoming games/tours/events, questions posed by participants, forms populated by hosts and/or participants), user information (e.g., profiles, credentials, and other information such as age, location, field(s) of interest, identifiers for social media services, etc.), and other assets. Such information could also be stored on the host computer server.

Figure 2:
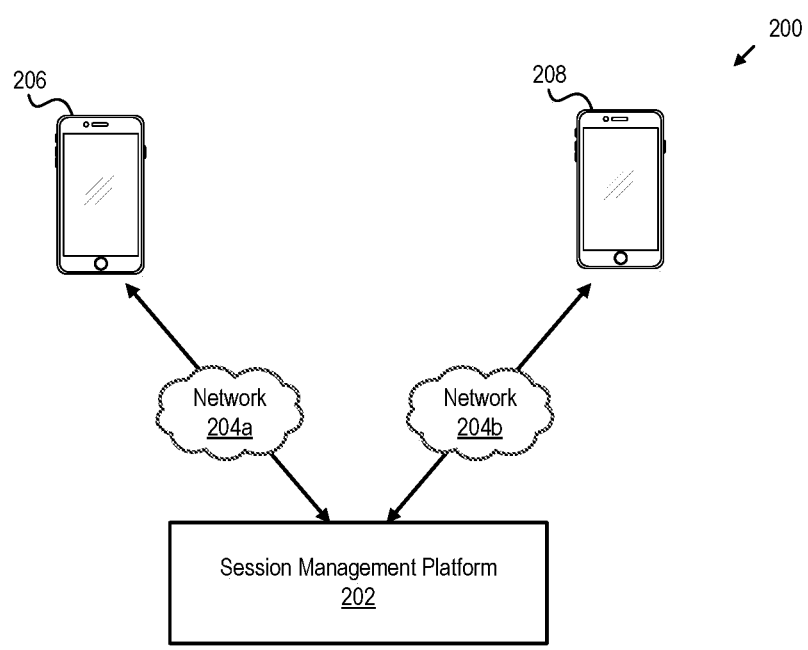
FIG. 2 depicts a communication environment that includes a session management platform configured to forward digital media between electronic devices belonging to different individuals, in accordance with various embodiments.

FIG. 2 depicts a communication environment 200 that includes a session management platform 202 configured to forward digital media between electronic devices belonging to different individuals, in accordance with various embodiments. Here, for example, the session management platform 202 receives digital media generated by a first electronic device 206 (here, a mobile phone associated with a host) and then forwards at least some of the digital media to a second electronic device 208 (here, another mobile phone associated with a participant). The first and second electronic devices 206, 208 may collectively be referred to as the "networked devices." Those skilled in the art will recognize that during an interactive session, the second electronic device 208 may be one of multiple electronic devices to which the digital media captured by the first electronic device 206 is forwarded. Said another way, the participant may be one of multiple participants who participate in the interactive session.

The networked devices can be connected to the session management platform 202 via one or more networks 204a-b. The network(s) 204a-b can include PANs, LANs, WANs, MANs, cellular networks, the Internet, etc. A networked device may communicate with another electronic device over a short-range communication protocol, such as Bluetooth® or Near Field Communication (NFC). For example, the session management platform 202 may reside on a mobile phone (e.g., in the form of a mobile application). In such embodiments, the host may use another electronic device (e.g., a webcam) to generate digital media. The digital media may be transferred, via a wired communication channel or a wireless communication channel, to the session management platform 202, which then causes at least some of the digital media to be forwarded to the other networked devices.

The session management platform 202 may be embodied as a collection of computer servers located in various geographical locations. Such a design enables the session management platform 202 to facilitate the distribution of digital media (e.g., as part of an interactive session) in a more efficient and scalable manner. For example, in embodiments where the interactive session is streamed in real time, the digital media can be forwarded to each participant from the nearest computer server having an instance of the session management platform 202. As another example, in embodiments where the interactive session is pre-recorded, the digital media can be pre-distributed to each computer server for improved playback.

FIGS. 3A-D illustrate several examples interfaces 300a-d that may be produced by a session management platform to manage interactive sessions in a systematic manner. More specifically, these interfaces illustrate how the arrangement of digital media feeds may vary depending on the number of hosts and/or the number of participants involved in an interactive session.

Figure 3A:
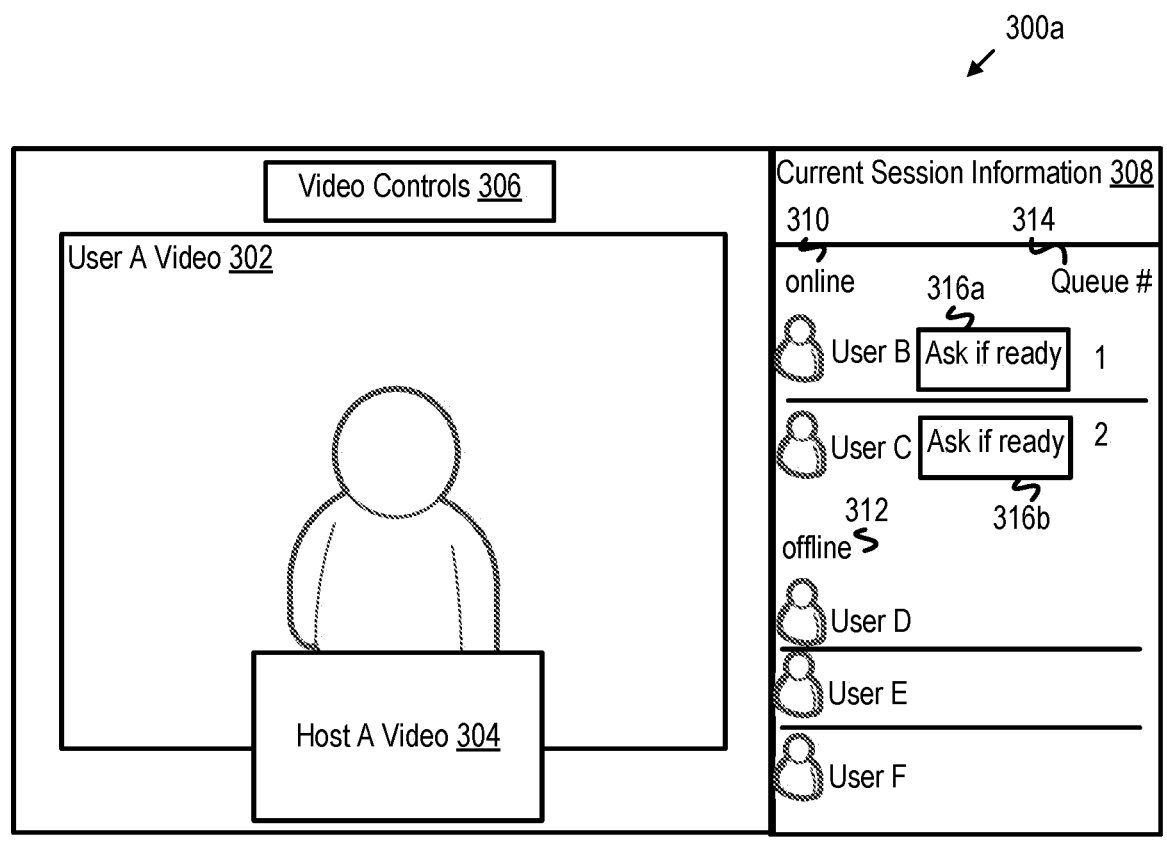
FIG. 3A illustrates an interface for facilitating a video session between a host and a user, in accordance with various embodiments.

FIG. 3A illustrates an interface 300a for facilitating a video session between a host and a user, in accordance with various embodiments. As shown in FIG. 3A, a participant (e.g., User A) can communicate with a host (e.g., Host A) via the interface 300a. Particularly, the interface 300a may include User A video 302 providing multimedia communication (e.g., video, audio, text) with Host A video 304. For example, Host A can respond to a question provided by User A on the interface 300a. The interface 300a can facilitate near real-time video/audio communication between the host and the user.

In some embodiments, the interface 300a may only allow the participating users (e.g., User A and Host A) to access the video communication on the interface 300a. In other embodiments, a group of users (e.g., User B and User C) can view the communication occurring between User A and Host A on the interface 300a. Further, non-participating users (e.g., User B and User C) may view the video between User A and Host A but may be unable to provide video or audio until the host allows such communication. The non-participating users (e.g., User B and User C) may be able to provide input text to a thread visible to all users on the interface 300a. The thread may at least partially overlay User A video 302 and/or Host A video 304, so that the text is readily viewable as Host A and User A communicate with one another.

As shown in FIG. 3A, the interface 300a may include video controls 306 to control features of the video and/or audio communication between the user and host. Video controls 306 are further discussed with respect to FIG. 10.

The interface 300a can include current session information 308. Current session information may include information relating to online users 310, offline users 312, and the queue number 314 for each online user in the queue. A host or a managing observer can send a request as to whether a user in the queue is ready to be placed in video by interacting with a digital element accessible on the interface 300a. Here, for example, an "ask if ready" button 316a-b is collocated alongside the identifier for each online user.

As detailed below, the user with the highest priority in a queue (e.g., User A) may have her video content streamed to the interface 300a. After the conclusion of the interaction between User A and Host A, the video stream for User A can be terminated, so that User A Video 302 is removed from the interface 300a and replaced by video content of the next-highest user in the queue (e.g., User B). Accordingly, the host can selectively communicate with the online users by selecting them from the queue, or the session management platform can automatically select online users for participation based on their order in the queue. As further discussed below, the queue may represent a priority-based ordering of the users.

Figure 3B:
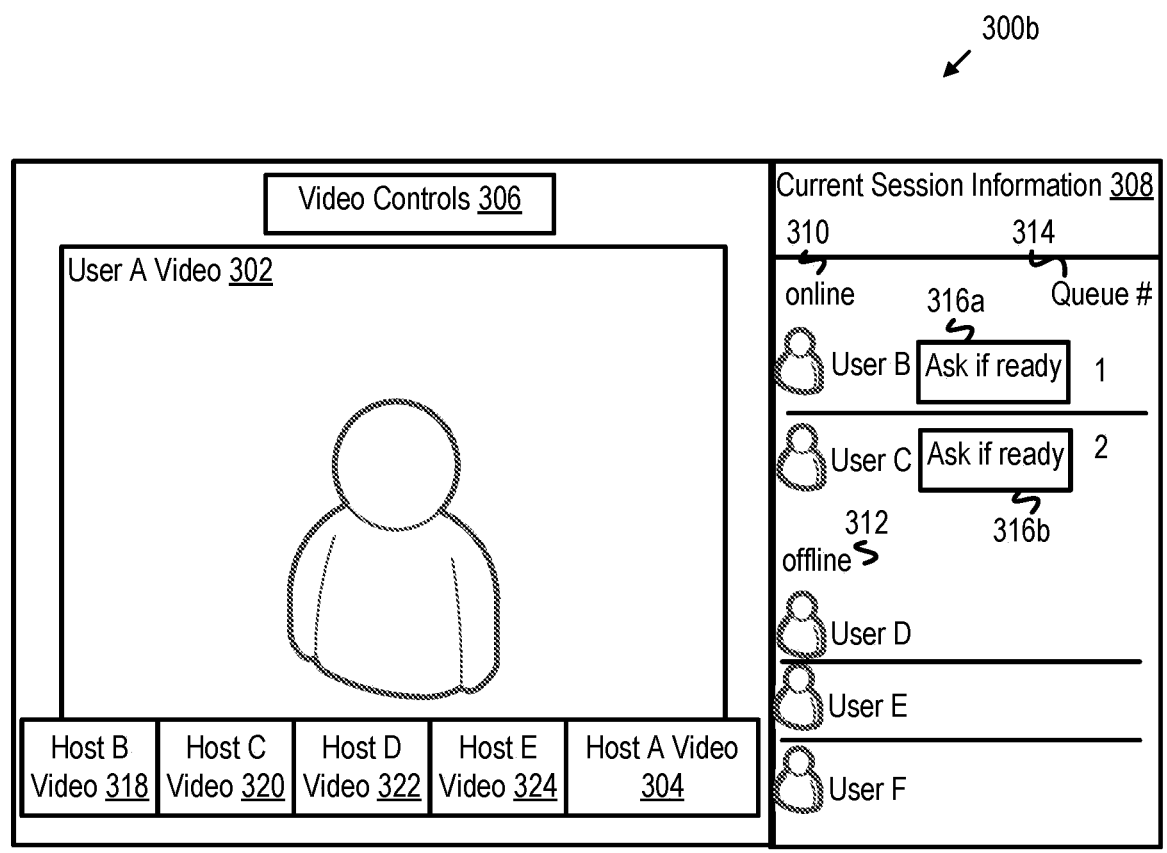
FIG. 3B illustrates an interface facilitating a video session between multiple hosts and a user, in accordance with various embodiments.

FIG. 3B illustrates an interface 300b facilitating a video session between multiple hosts and a user, in accordance with various embodiments. As shown in FIG. 3B, multiple hosts (e.g., Host A 304, Host B 318, Host C 320, Host D 322, Host E 324). For example, members of a group (e.g., a band, or actors in a television program) may simultaneously communicate with a user (e.g., User A). The interface 300B may include video streams for Hosts A-E along a stripe below the User A video 302.

The hosts and the participating user (e.g., User A) may be able to simultaneously communicate via the interface 300b. When a host is communicating (e.g., when Host A is speaking), the video related to the communicating host (e.g., Host A video 304) can be visually highlighted in some manner. For example, the video related to the communicating host may be highlighted. As another example, the video related to the communicating host may experience an increase in size or brightness. Further, the non-speaking hosts may have their video brightness lowered, audio muted, etc.

Figure 3C:
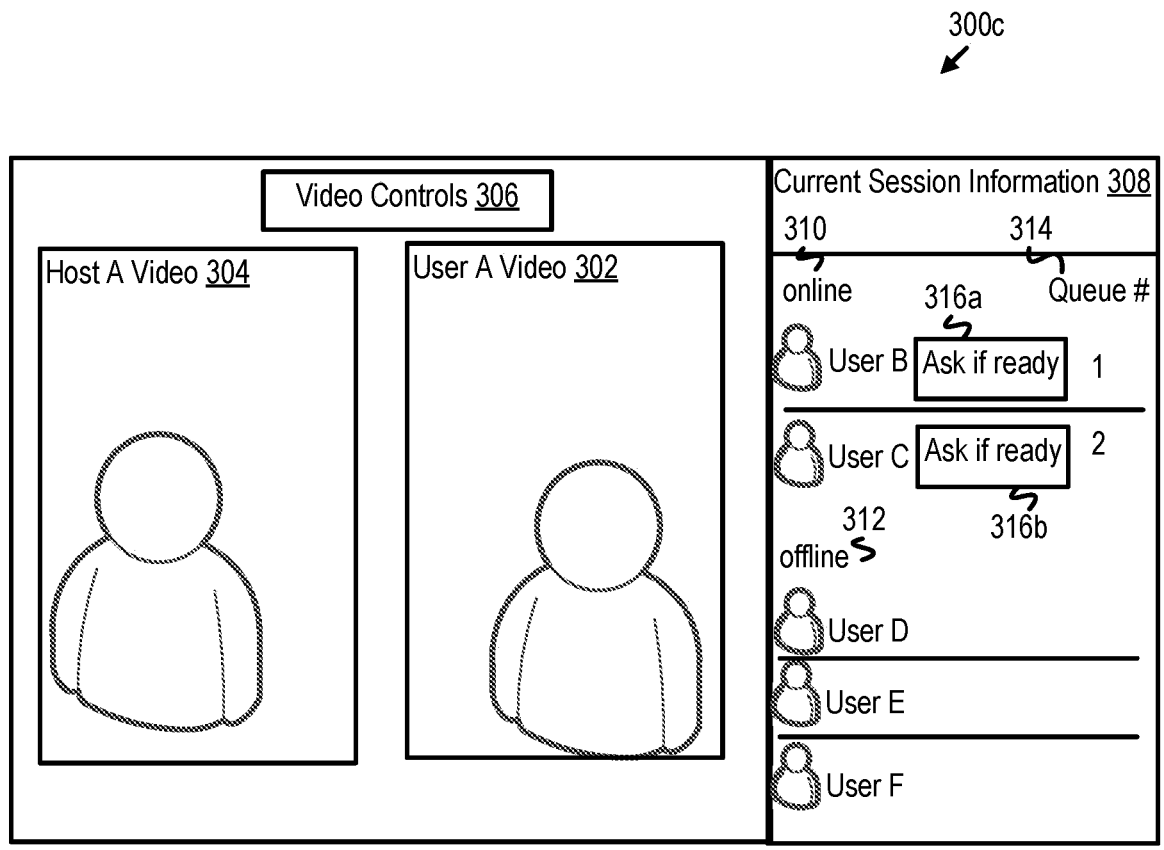
FIG. 3C illustrates an interface facilitating a side-by-side video session between a host and a user, in accordance with various embodiments.

FIG. 3C illustrates an interface 300c facilitating a side-by-side video session between a host and a user, in accordance with various embodiments. As shown in FIG. 3C, Host A video 304 and User A video 302 can be located adjacent to one another on the interface 300*c*.

Figure 3D:
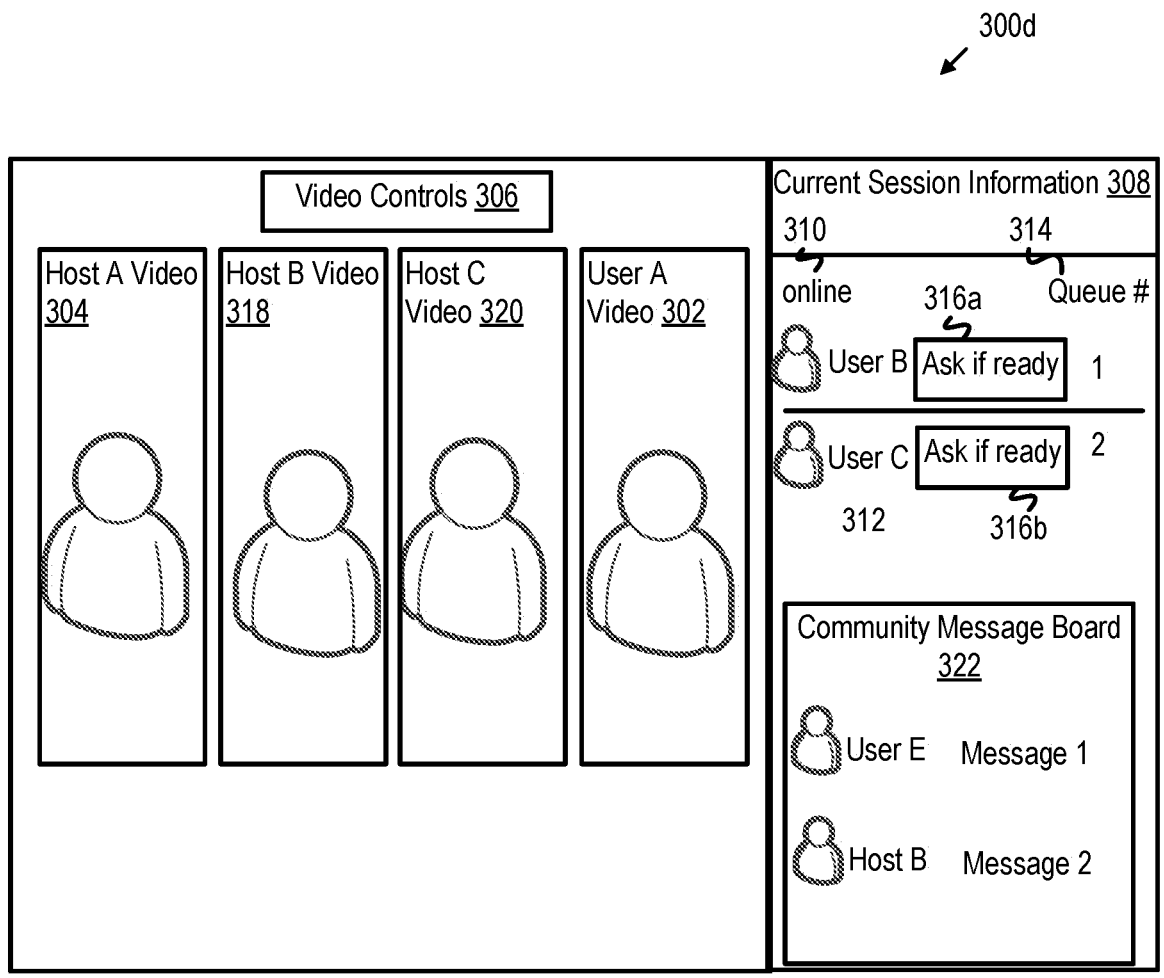
FIG. 3D illustrates an interface facilitating a side-by-side video session between multiple hosts and a user, in accordance with various embodiments.

FIG. 3D illustrates an interface 300*d* facilitating a side-by-side video session between multiple hosts and a user, in accordance with various embodiments. As shown in FIG. 3D, multiple hosts (e.g., host A video 304, host B video 318, host C video 320) may be shown side-by-side on the interface 300*d* next to the user A video 302.

As shown in FIG. 3D, the interface 300*d* can include a community message board 322. The community message board 322 may allow users (e.g., online users, including potential participants and observers), hosts, and operating managers to interact with the community message board 322. For example, User E may provide a first text message to the board 322, and a host (e.g., Host B) may respond to the first text message with a second text message. The message board 322 may act as an interface through which users, hosts, and observers can provide input during the video session. The message board 322 can allow message that include various text, icons, images, etc.

Figure 4:
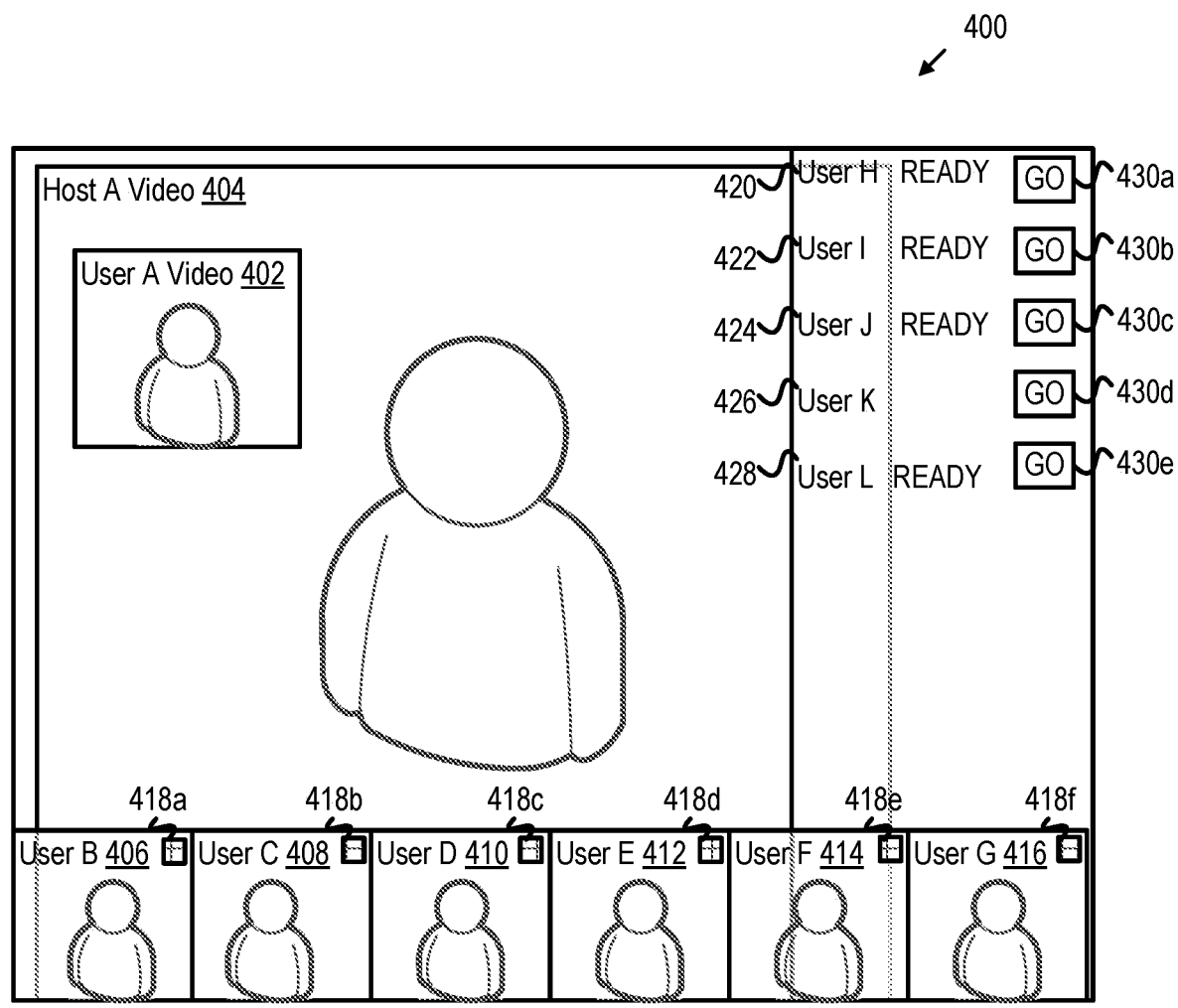
FIG. 4 illustrates an interface to manage interactive sessions in a systemic manner, in accordance with various embodiments.

FIG. 4 illustrates an interface 400 to manage interactive sessions in a systemic manner, in accordance with various embodiments. As shown in FIG. 4, Host A can communicate with participating users via the interface 400. The interface 400 can facilitate communication between Host A video 404 and User A video 402. User A, who may represent the user with the highest priority in the queue, can be allowed to directly communicate with the host via streamed audio and/or video.

As shown in FIG. 4, the interface 400 may include segments with the video streams of multiple users (e.g., User B 406, User C 408, User D 410, User E 412, User F 414, User G 416) arranged along the bottom of the interface. The users with video shown along the bottom of the interface may be users that are next in priority in the queue. For example, User B 406 may have the second highest position in the queue, and User C 408 may have the third highest position in the queue. The video feeds along the bottom of the interface may be arranged in order of priority so that the host can readily select users for participation in order of priority. The users (e.g., Users B-G) shown along the bottom of the interface may have video displayed but may have muted audio, where the only audio is allowed from the host and the participating user (e.g., User A).

In some embodiments, the interface 400 is viewable by all participants in the multimedia session. Thus, non-participating participants may be able to view the multimedia session between the host(s) and the participating user. In other embodiments, only a subset of users are allowed access to the interface. For example, users that have joined the multimedia session to participate may be permitted to access the interface 400, while non-participating users may have to wait to view a recording of the multimedia session.

Further, users that have lower priority in the queue may be shown in a column visible on the interface 400. Here, for example, User H 420, User I 422, User J 424, User K 426, and User L 428 are shown in a column along the side of the interface 400. The user who is highest in the column (e.g., User H 420) may have the highest priority among users in the column. However, the user who is highest in the column may have a lower priority than any user (e.g., Users B-G) along the bottom stripe of the interface.

In some embodiments, the interface 400 does not include any video feeds along the bottom side. Instead, all potential participants may be shown in a list visible on the interface 400. As noted above, the list may be representative of a priority-based ordering of the potential participants, in which case the host may be able to easily select the highest potential participant in terms of priority for participation by choosing the name (or some other identifier) located at the top of the list.

The host (or a managing observer) can manage the interface by identifying which user is allowed to be a participating user. For example, the host may be permitted to end the video session with a first user (e.g., User A) whenever she chooses. In the event that the host ends the video session with a first user (e.g., User A), the user with the next highest priority (e.g., User B) can be added to the interface to communicate with the host. In this event, Users C-G along the bottom stripe may move up in the priority queue, as represented by moving each video stream one position to the left. Further, User H, the user that is one position lower in the priority queue than User G, can have her video stream added to the bottom stripe in place of User G, as each video stream moves one position to the left.

The host can view more information about any user on the bottom stripe by selecting button 418*a-f*. Selecting the button corresponding to a user may allow the host to select the user, move the user up in the priority queue, or cancel the user's video stream. For example, the host can select a button 418*d* associated with User E 412 to select User E 412 as the participating user to have video associated with User E 412 added in place of the video of User A 402.

Buttons 418*a-f* can be used to remove users from the session. For example, if User C 408 is violating a rule of the video session, the host (or the managing observer) can select button 418*b* to turn off video of User C 408 and remove User C 408 from the queue. The host can view more information or select a user on the column by selecting a go button 430*a-e* corresponding to the user.

Figure 5:
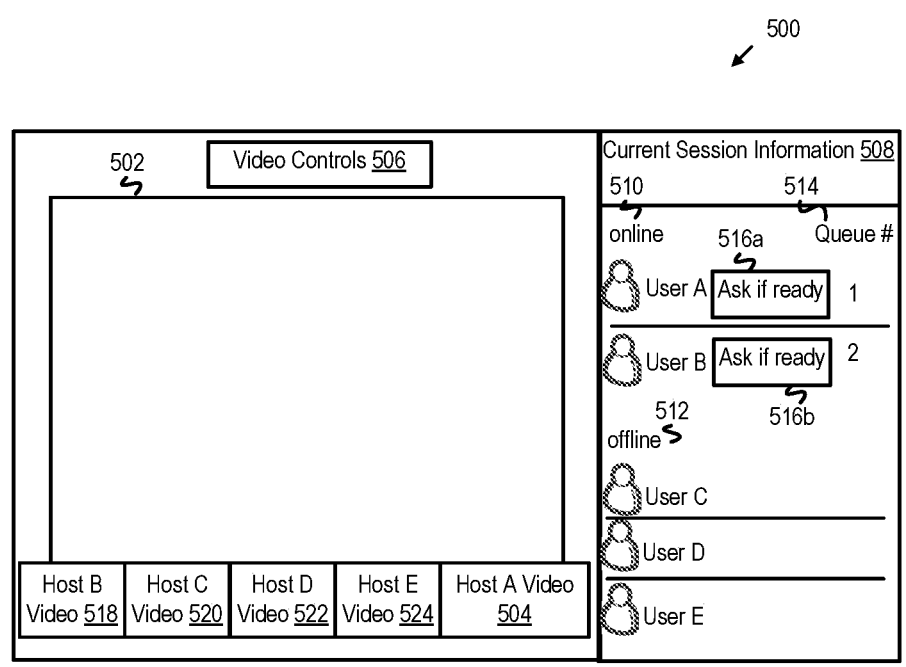
FIG. 5 includes an interface showing a network-accessible area (also referred to as a "green room") where host(s) and managing observer(s) can communicate (e.g., via text, audio, or video) before, during, or after an interactive session, in accordance with various embodiments.

FIG. 5 includes an interface 500 showing a network-accessible area (also referred to as a "green room") where host(s) and managing observer(s) can communicate (e.g., via text, audio, or video) before, during, or after an interactive session, in accordance with various embodiments. The green room may be imperceptible to participants involved in the interactive session. Thus, communication between the host(s) and managing observer(s) may occur "behind the scenes" from the participant(s). Generally, the green room represents a private environment in which host(s) (e.g., celebrities) and managing observer(s) (e.g., managers) can discuss/collaborate before an interactive session begins, during an interactive session, between interactive sessions, etc. Each interactive session may be associated with a dedicated green room that is only accessible to those host(s)/managing observer(s) who are involved in the interactive session. Thus, the session management platform may strategically moderate which host(s)/managing observer(s) have access to a given green room.

The green room may allow for multiple hosts to prepare themselves by communicating via the interface 500. The green room may permit host(s) and/or managing observer(s) to communicate before, during, or after an interaction session without observation by any participants. In essence, the green room may enable these individuals to communicate "behind the scenes." The interface 500 may include a display 502 that shows video of the host(s). The hosts can communicate the other host devices and operating device can manage session and prepare the queue using a manager device. Various settings of the video can be modified via video controls 506.

As shown in FIG. 5, the hosts and/or the managing observer can view the current queue of online users 510 and offline users 512 via current session information 508. The hosts/managing observer can initiate the video session based on selecting one of the ask if ready buttons 516*a-b* associated with an online user in the queue. The managing observer can inspect (or 'peek') at the video/audio of an online user 510 to ensure that the user is following all rules for the video session.

Figure 6:
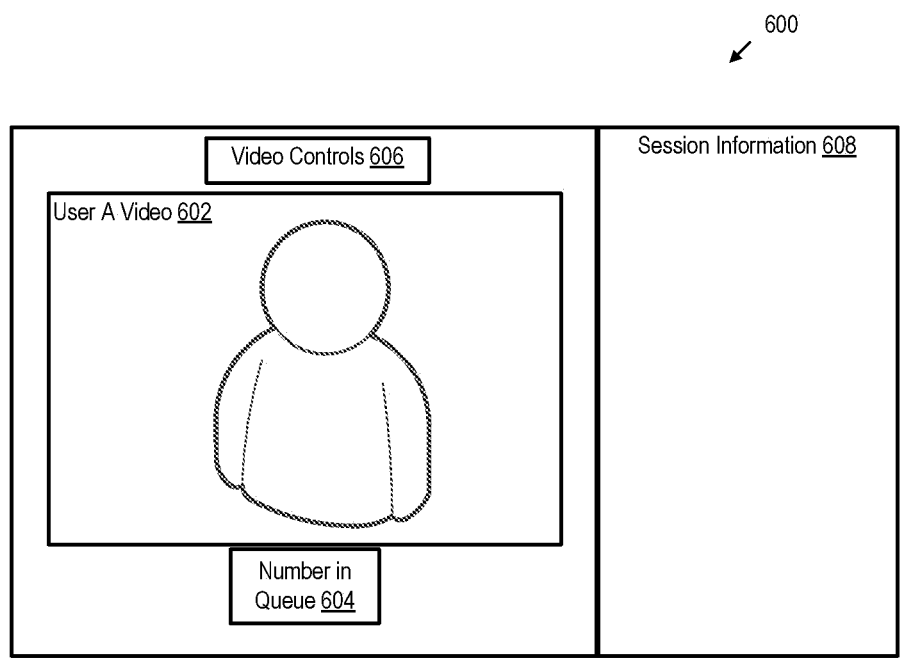
FIG. 6 includes an interface showing a network-accessible area (also referred to as a "waiting room") where participant(s) can wait until a host begins an interactive session, in accordance with various embodiments.

FIG. 6 includes an interface 600 showing a network-accessible area (also referred to as a "waiting room") where participant(s) can wait until a host begins an interactive session, in accordance with various embodiments. Similar to the green room, the waiting room may be imperceptible to hosts and managing observers involved in an interactive session. In some embodiments, communication between participants is not visible to the host(s) or managing observer(s) of an interactive session. In other embodiments, communication between participants is visible to the host(s) or managing observer(s) of an interactive session. In such embodiments, the host(s) or managing observer(s) may tailor the interactive session based on the communication. For example, a host may cause a poll to be created that asks participants which question(s) should be answered.

In the waiting room, a user can test their audio and video capabilities. Further, the waiting room interface can indicate what number in the queue 604 the user presently is. For example, the number in queue 604 can indicate that the user has the third position in the queue, indicating that when two other users finish their video session with the host, the video session with the user may initiate.

The waiting room interface may include session information 608 indicating various information relating to the video session with the host. For example, session information 608 can include information relating to the host, information relating to the users in the queue, etc.

In the waiting room, a managing observer can inspect the video/audio of the user to determine whether the video/audio includes a suitable quality. Further, the managing observer can determine whether the user is in accordance with various rules for the video session. For example, a video session rule may include a rule indicating that a series of words may not be used by the users. If the user uses any of the restricted words, the managing observer may remove the user from the queue for violating video session rules. As noted below, the session management platform may dynamically inspect the video feed of the user to determine whether the user is adhering to video session rules.

FIGS. 7A-D illustrate how participants can be assigned a position in a queue. Assigning participant(s) to a position in a queue may be referred to as a "queuing process" or a "queuing protocol." Each participant may be assigned a number indicative of a position in the queue, while in other embodiments a predetermined count of participants (e.g., the top 5, 10, or 25) will be assigned a number. This number may be used by the session management platform to identify which participant is next based on her place in the queue. The session management platform may manage the queue such that participants can be dynamically added and removed from the queue based on whether the participant is available to join the video session or if the participant is no longer available to join the video session.

Figure 7A:
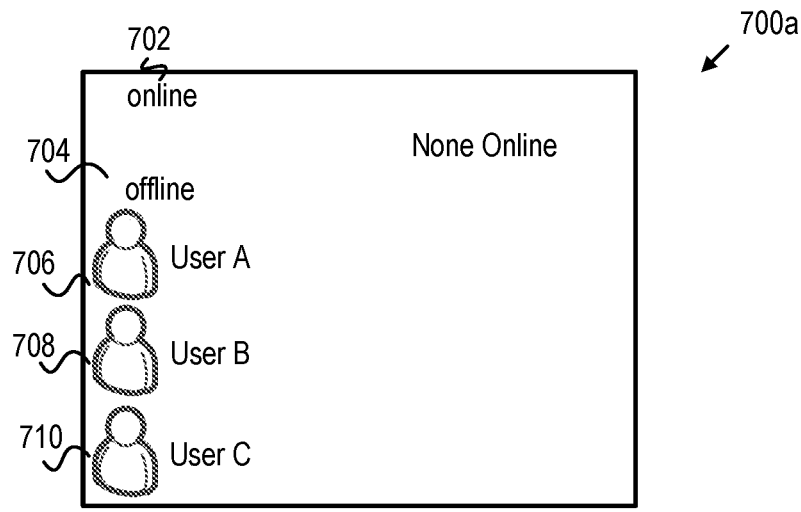
FIG. 7A illustrates a host interface indicating that no users are online, in accordance with various embodiments.

FIG. 7A illustrates a host interface 700*a* indicating that no users are online, in accordance with various embodiments. The host interface 700*a* may be viewed by a host and/or managing observer indicating a status of the queue and whether users are in the queue or offline. In the example as shown in FIG. 7A, the users (e.g., User A 706, User B 708, User C 710) are offline users 704. In other words, no users are yet online and ready to be added to the queue. Offline users 704 may include users that are registered with the video session or have an account linked to the video session but not yet available to join the video session. The offline users 704 may include users with an audio/video quality below a threshold quality or users that have not been approved by the managing observers following the rules of the video session.

Figure 7B:
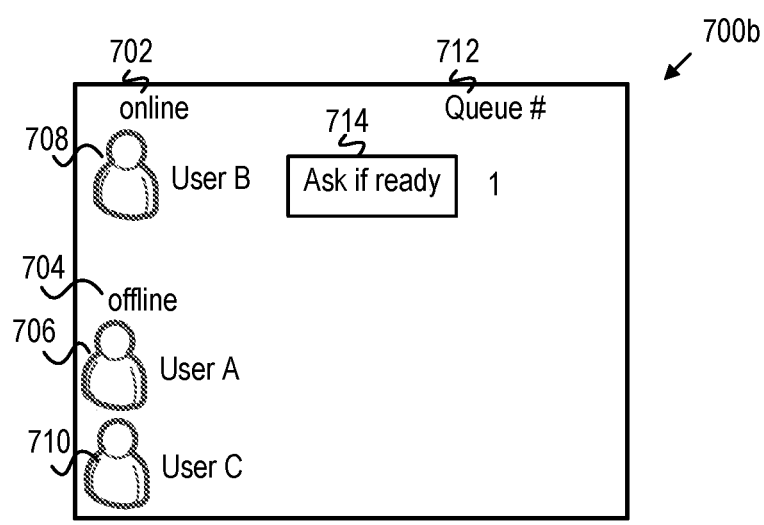
FIG. 7B illustrates a host interface indicating that a first user is online and added to a queue, in accordance with various embodiments.

FIG. 7B illustrates a host interface 700*b* indicating that a first user is online and added to a queue 712, in accordance with various embodiments. In this example as shown in FIG. 7B, User B 708 has come online and is included as an online user 702. When User B 708 comes online, User B 708 may be assigned a position in the queue. The position in the queue may be determined based on a time that the user came online. A timestamp may be associated with the user indicating the time that the user came online. Accordingly, in this example, User B may have a first position in the queue based on User B having the earliest timestamp indicating that they came online before any other user. The position in the queue could be based on a ranking (e.g., specified by the host or the managing observer), an interest level (e.g., as determined based on inclusion in a fan club), or payment status (e.g., whether the given user has paid for the chance to interact with the host) in addition to, or instead of, the timestamp. Thus, priority may not be solely based on timestamps indicative of when users confirmed an invitation to the interactive session, joined the interactive session, or indicated an interest in participating in the interactive session.

The session management controller may determine that a user is online based on any of a variety of triggering events. Example of triggering events include the user responding to a request message indicating that the user is online, the user device successfully connecting to a network (e.g., the Internet), the user successfully logging into a password-protected account associated with the interactive session, the user sending a request to join the interactive session, etc.

As shown in FIG. 7B, the host (or the managing observer) can send a request to user B 708 inquiring whether the user is ready to join the video session via ask if ready button 714. After receiving a positive indication that the user is ready to join the interactive session, the user may have their video added to the interactive session and can directly communicate with the host. Said another way, after receiving input indicative of a confirmation that the user is ready to join the interactive session, video of the user can be streamed to an interface to permit bidirectional communication with the host.

Figure 7C:
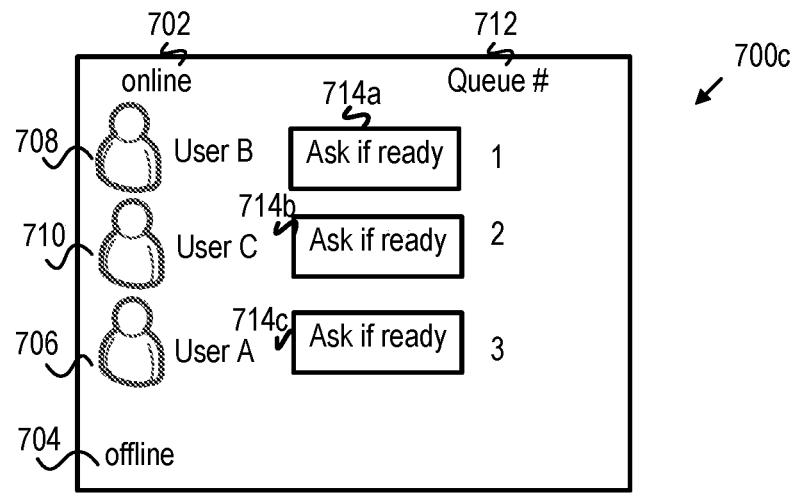
FIG. 7C illustrates a host interface indicating that multiple users are added to a queue, in accordance with various embodiments.

FIG. 7C illustrates a host interface 700*c* indicating that multiple users are added to a queue 712, in accordance with various embodiments. In the example as shown in FIG. 7C, User A 706, User B 708, and User C 710 are all online users 702. Further, in this example, User B 708 is first in the queue 712, User C 710 is second in the queue, and User A 706 is third in the queue.

The position of users in the queue may be at least partially based on a time that a user has joined the multimedia session. Joining the multimedia session may be indicative of when a user device has successfully connected to the multimedia session or when the user sends a request to join the multimedia session, for example.

The positioning of a user in the priority queue may be modified based on determining that the user is associated with a subset of users, such as a set of subscribing users, for example. As an example, if a user is a subscribing user, the user may be moved up in the priority queue by a predetermined amount.

The listing of users in the order in the priority queue may be presented to the host(s) or managing observer. Based on this listing of users, a host/managing observer may select any user in the priority queue to select a user as a participating user.

Figure 7D:
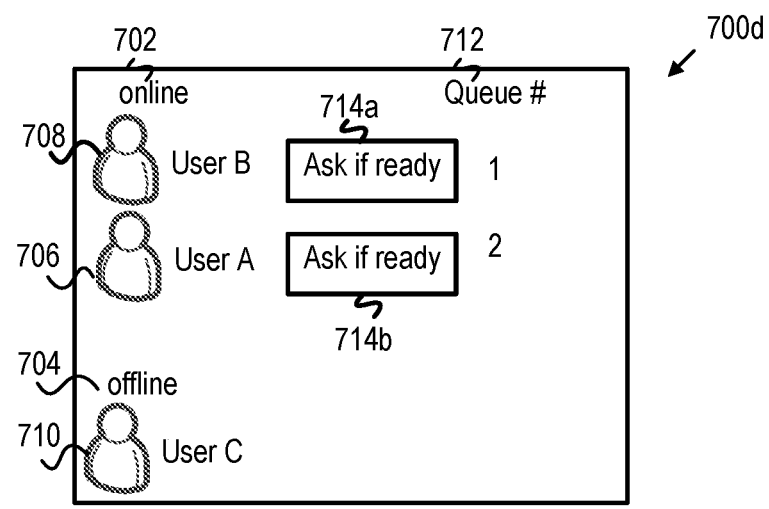
FIG. 7D illustrates a host interface indicating that a user transitions from an online user to an offline user, in accordance with various embodiments.

FIG. 7D illustrates a host interface 700d indicating that a user transitions from an online user 702 to an offline user 704, in accordance with various embodiments. In the example as shown in FIG. 7D, User C 710 moves from an online user 702 to an offline user 704. When a user becomes an offline user 704, the user may lose her place in the priority queue. Accordingly, the online users 702 may move up in the priority queue based on the removal of User C from the queue. For example, User B may still maintain a first position in the queue and User A may move from a third position in the queue to a second position in the queue.

A user may transition from an online user 702 to an offline user 704 when a triggering event occurs. Example of triggering events include a user losing network connectivity, a user failing to respond to a status request, a user failing to follow video session rules, a user exiting the waiting room, etc.

FIGS. 8A-F illustrate how a handshake protocol may be implemented so that parties can confirm their readiness to initiate an exchange (also referred to as an "engagement") as part of an interactive session. Initially, participant(s) in an interactive session may be placed in a queue that is visible to the host. When the host is ready to conduct the interactive session, the host can ask each participant whether they are ready by selecting a digital element featured alongside information about each participant (e.g., name, age, connectivity status). Such action may prompt the generation of a notification that asks the participant whether they are ready to join the video session.

If the session management platform receives input indicative of a response that the participant is ready, then the session management platform can initiate the exchange. For example, the session management platform may cause an electronic device associated with the participant to begin capturing digital media (e.g., audio and/or video) and then share the digital media with other individuals involved in the interactive session. Thus, the digital media could be streamed to an electronic device associated with the host and electronic device(s) associated with other participant(s) in the interactive session. A host and/or managing observer can initiate a handshake with another user to begin a session. Any action taken by a single host or managing observer can begin a session or affect other parties present in the session.

However, if the session management platform receives input indicative of a response that the participant is not ready (or no input at all), then the session management platform can shift the participant downward in the queue. Accordingly, the session management platform can ensure that the host consistently interacts with ready/responsive participants.

Figure 8A:
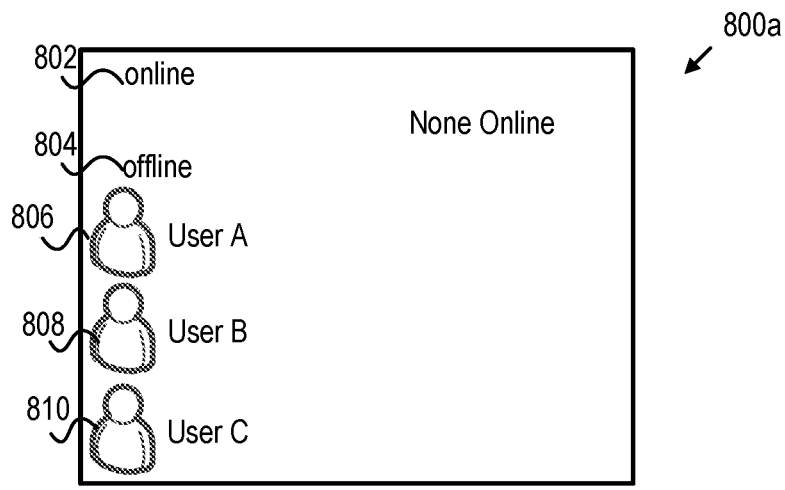
FIG. 8A illustrates a host interface indicating that all users are offline, in accordance with various embodiments.

FIG. 8A illustrates a host interface 800a indicating that all users are offline, in accordance with various embodiments. The host interface 800a may be viewed by a host and/or managing observer indicating a status of the queue and whether users are in the queue or offline. In the example as shown in FIG. 8A, the users are offline users 804. In other words, no users are yet online users 802 and ready to be added to the queue.

Figure 8B:
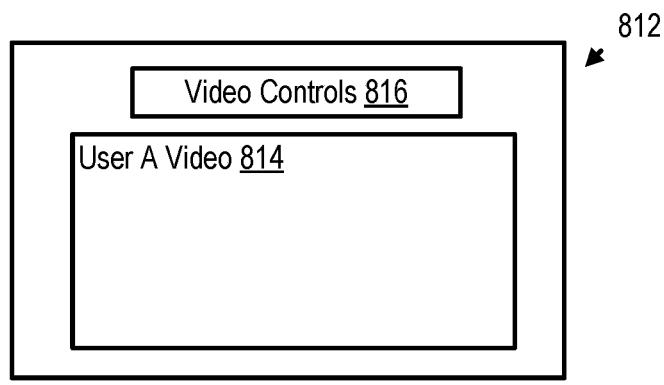
FIG. 8B illustrates a waiting room for a user, in accordance with various embodiments.

FIG. 8B illustrates a waiting room 812 for a user, in accordance with various embodiments. As shown in FIG. 8B, User A 806 may transition from an offline user 804 to an online user 802. Upon this transition, User A 806 may be added to a waiting room where the user may wait until the position in queue indicates that User A has the highest position in the queue and ready to be added to the video session. The waiting room 812 may include any features described with respect to FIG. 6.

Figure 8C:
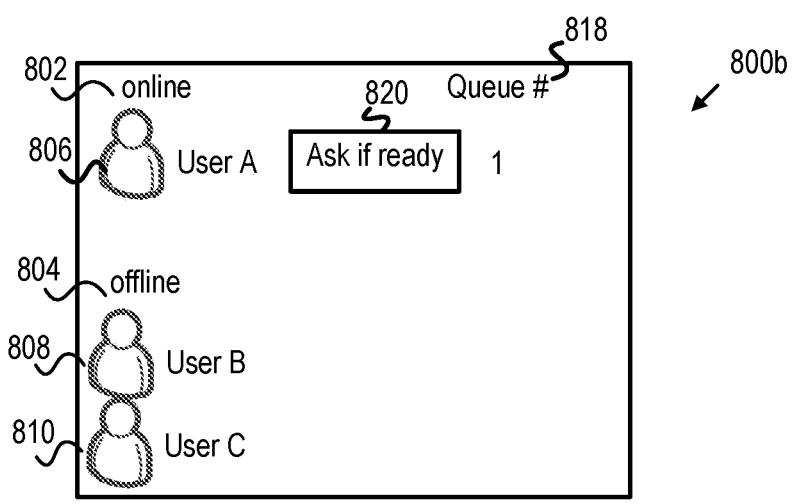
FIG. 8C illustrates a host interface indicating that users are both online and offline, in accordance with various embodiments.

FIG. 8C illustrates a host interface 800b indicating that users are both online and offline, in accordance with various embodiments. As shown in FIG. 8C, the host (or the operating manager) can identify that user A is online and in the waiting room 812. Further, in this example, User A is first in the priority queue 818. The host can send a request inquiring if a user is ready to join a video session. The host can select the ask if ready button 820 to send a request to the user device inquiring if the user is ready to join the session.

Figure 8D:
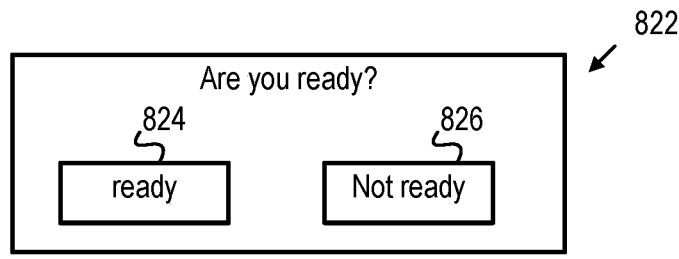
FIG. 8D illustrates a confirmation interface requesting an indication from a user as to whether they are ready to join a video session, in accordance with various embodiments.

FIG. 8D illustrates a confirmation interface 822 requesting an indication from a user as to whether they are ready to join a video session, in accordance with various embodiments. As shown in FIG. 8D, User A 806 can be presented with the confirmation interface 822 requesting a selection by User A 806 as to whether they are ready to join a video session with the host. The user can select a ready button 824 if the user is ready to join the session. Alternatively, the user can select a not ready button 826 if the user is not ready to join the session. The confirmation interface 822 may include a countdown clock that closes the confirmation interface 822 upon expiry of the clock. The user may be identified as not ready to join the session upon the countdown clock expiring.

Figure 8E:
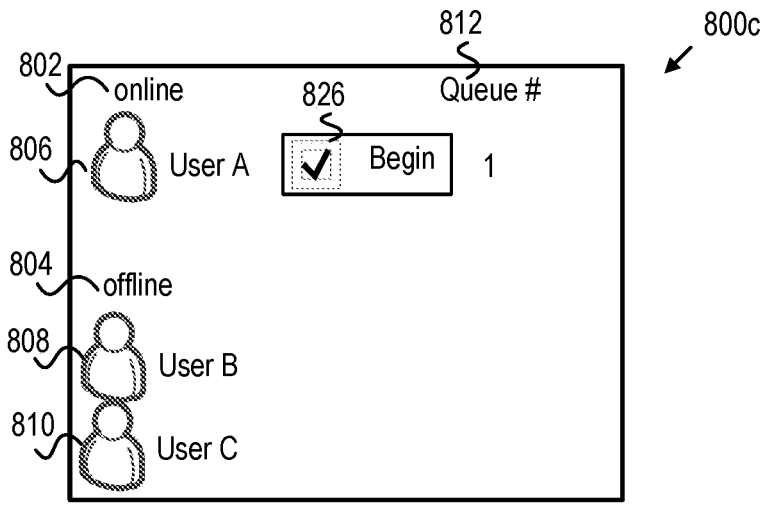
FIG. 8E illustrates a host interface indicating that a user is online and ready to join a video session, in accordance with various embodiments.

FIG. 8E illustrates a host interface 800c indicating that a user is online and ready to join a video session, in accordance with various embodiments. The interface 800c can indicate that a user (e.g., User A 806) is online and ready to join a video session based on the user selecting the ready button 824 in the confirmation interface 822. If the user has confirmed that she is ready to be added to a video session, the text shown on a button 826 accessible to a host/managing observer may change. For instance, the button 826 may include phrases such as "Begin Chat," "Initiate Interaction," and the like to indicate that the host/operating manager can begin the video session. In some embodiments, an icon (e.g., a checkmark) is added to the button 826 to indicate that the user has been reviewed (e.g., "peaked on" as discussed below with respect to FIGS. 9A-C). Such an approach may be desirable as it visually indicates to the host/managing observer that the user is ready to begin the video session. Said another way, the icon may visually indicate which users have been deemed safe to interact with.

Figure 8F:
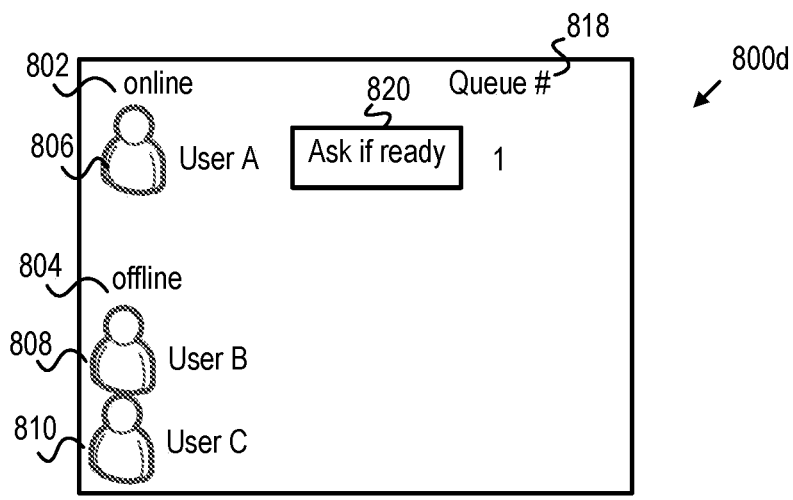
FIG. 8F illustrates a host interface indicating that a user is online but not ready to join a video session, in accordance with various embodiments.

FIG. 8F illustrates a host interface 800d indicating that a user is online but not ready to join a video session, in accordance with various embodiments. Interface 800d can indicate that a user (e.g., User A 806) is online but not ready to join a video session based on the user selecting the not ready button 826 in the confirmation interface 822 or if a countdown clock expires without the user selecting a ready button 824.

If a user is online but not ready to join a video session, the interface 800d may include the user online with an ask if ready button 820 near the user that can be selected to initiate the confirmation interface 822 to be sent to the user.

Figure 9A:
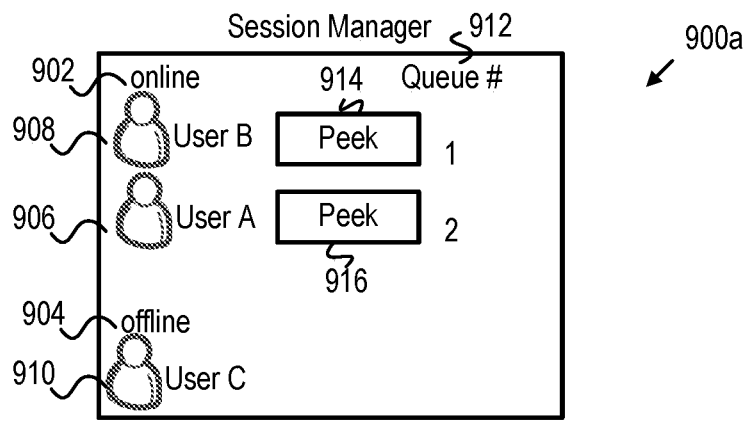
FIG. 9A illustrates a host interface indicating that users are online and are ready to initiate a peek procedure, in accordance with various embodiments.
Figure 9B:
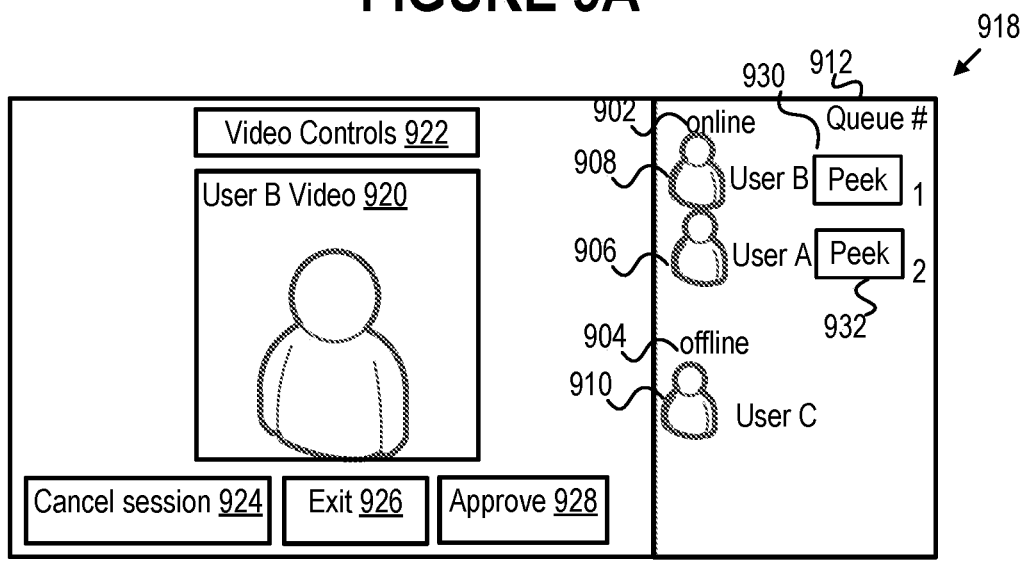
FIG. 9B illustrates a waiting room associated with a user that may be viewed by a host and/or operating manager, in accordance with various embodiments.
Figure 9C:
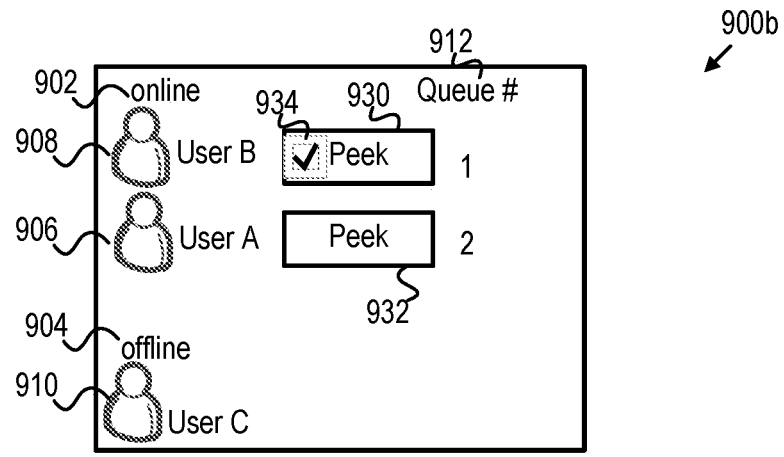
FIG. 9C illustrates a host interface indicating that a user has been approved during the peek procedure, in accordance with various embodiments.

FIGS. 9A-C illustrate how a host or a managing observer can "peek" at the media feed of a given participant to ensure that precautionary policies are met. For example, if the session management platform is configured to handle video, a managing observer may choose to peek at the video stream of a given participant to ensure that inappropriate content will not be shown. This may be done by the managing observer in real time as the host conducts an interactive session. Additionally or alternatively, the host may be able to "peek" at the video stream of the given participant.

"Peeking" may occur before an interactive session begins and/or while an interactive session is taking place. For example, the host may "peek" at the digital media feed of the participant who will be involved in the first engagement of an interactive session, while the managing observer may "peek" at the digital media feeds of participants who will be involved in subsequent engagements during the interactive session.

FIG. 9A illustrates a host interface 900a indicating that users are online and are ready to initiate a peek procedure, in accordance with various embodiments. In the example as shown in FIG. 9A, User A 906 and User B 908 may be online users 902 assigned to positions in the queue, and User C 910 may be an offline user 904. In this example, the online users in the queue may be inspected to determine whether the user is following rules of the video session. The host/managing observer may select a peek button 914, 916 to open a waiting room for a user.

FIG. 9B illustrates a waiting room 918 associated with a user that may be viewed by a host and/or operating manager, in accordance with various embodiments. A host/operating manager may view the waiting room 918 to peek at the user to determine whether the user is following all rules of the video session. As noted above, the waiting room 918 includes video and/or audio of the user 920.

The host/operating manager can determine whether a user is following video session rules. The video session rules may be provided to the user such that the user can view the rules before joining a video session. As an example, a rule for a video session may include that a user cannot wear a shirt with a specific pattern on the shirt. The operating manager can inspect user video to determine whether the user is wearing a shirt with a specific pattern. If the operating manager determines that the user is wearing a shirt with the specific pattern, the operating manager may select a cancel session button 924 and user may be removed from the queue.

The set of rules can be determined by the host and/or operating manager. The set of rules can include any language, conduct, behavior, expression, etc., that the host/operating manager would like to have excluded from the video session.

The user can select an exit button 926 to remove themselves from the waiting room 918 and the queue. The operating manager can select the exit button 926 to exit from the waiting room 918 of the user. If the operating manager determines that the user is in accordance with rules for the video session, the operating manager can select the approve button 928. When the approve button 928 is selected, a checkmark 934 may appear alongside the user.

The session management controller can utilize object detection and speech recognition to determine whether the user video/audio is in accordance with the rules established for the video session. For example, the session management controller can determine whether a user is violating a rule against using specific language by implementing speech recognition and comparing the recognized speech with the specific language. As another example, object recognition and facial recognition can be utilized to determine whether a user is violating any rules against making specific gestures. The session management controller may utilize feedback to train the object recognition and speech recognition to increase accuracy of the object and speech recognition.

Upon determining that a user is an accordance with the rules of the video session, a host interface 900b can be updated to reflect that the user video is approved. FIG. 9C illustrates a host interface 900b indicating that a user has been approved during the peek procedure, in accordance with various embodiments. As shown in FIG. 9C, after a user (e.g., user B 908) is approved during the peek procedure, a checkmark 934 can be included with a peek button 930. For example, the checkmark 934 may appear next to a given user after the given user has been approved by the host/managing observer (e.g., through selection of the approve button 928).

Figure 10:
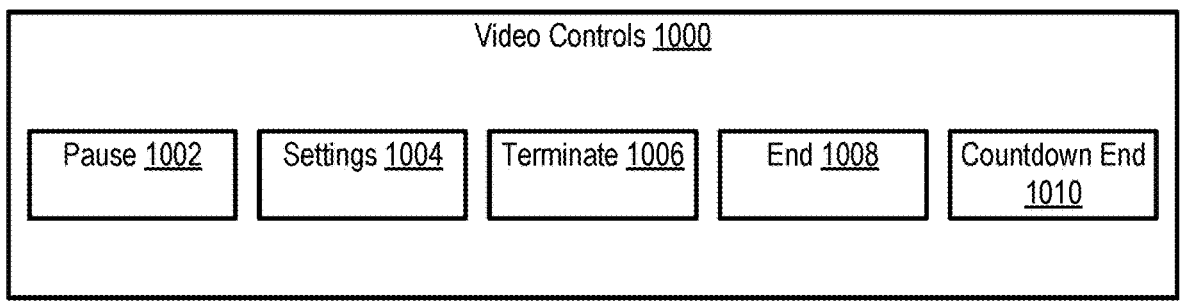
FIG. 10 is a block diagram of a set of video controls that may be used during an interactive session, in accordance with various embodiments.

FIG. 10 is a block diagram of a set of video controls 1000 that may be used during an interactive session, in accordance with various embodiments. For example, these controls may enable an individual to pause an interactive session, end an interactive session, terminate a digital media feed, initiate a countdown to termination of a digital media feed, etc. Generally, these controls will be accessible to the host throughout the interactive session. Additionally or alternatively, these controls could be accessible to managing observer(s) responsible for managing the interactive session.

Some controls may be accessible to participants as well. For example, when a participant is selected by the host, an electronic device associated with the participant may begin recording. While the electronic device is recording, the participant may be able to terminate the digital media feed. Moreover, participants may be able to leave an interactive session at any point in time.

As shown in FIG. 10, the video controls 1000 may include a pause button 1002, a settings button 1004, a terminate button 1006, an end button 1008, and a countdown end button 1010.

The pause button 1002 may pause a video session. Upon selecting the pause button 1002, the host video and audio may stop streaming on the video session and the session will include an indication that the host has paused the video. Similarly, the user may select the pause button 1002 to stop user video/audio.

The settings button 1004 may enable a host/user to modify various video/audio settings. Example settings that can be modified can include volume, brightness, contrast, video resolution, etc.

The terminate button 1006 may enable a host/operating manager to terminate the video session. Upon selecting the terminate button 1006, the host/managing observer may be requested to confirm that the video session is to be terminated. Terminating an interaction may prevent the user from receiving recordings/photos associated with the video session. For example, upon determining that the host terminated a video session involving a given user, the given user may be prevented from obtaining recordings/photos of the video session (e.g., to prevent potentially harmful dissemination over social media). The host/managing observer may also be asked to provide a reason they are terminating the video session. In some embodiments, the session management platform is configured to generate a log of terminated interactions that can be further examined to see why each termination occurred. For example, each terminated interaction in the log may be associated with information about the interaction (e.g., total duration, name, age) and contextual evidence such as recordings, photos, or transcripts of the interaction.

The end button 1008 may end the video session upon selection by any of the participating user, host, and/or operating manager.

The countdown end button 1010 may initiate a countdown clock to the video session, where the video session is configured to end at the expiry of the countdown clock.

Generally, the countdown end button 1010 is selected by the host/managing observer in order to alert the user that the video session is about to end. For example, a countdown clock may be added to the video session upon selection of the countdown end button 1010 with a predetermined countdown duration (e.g., ten seconds). Such an approach allows video sessions to conclude gracefully without an abrupt ending.

Figure 11:
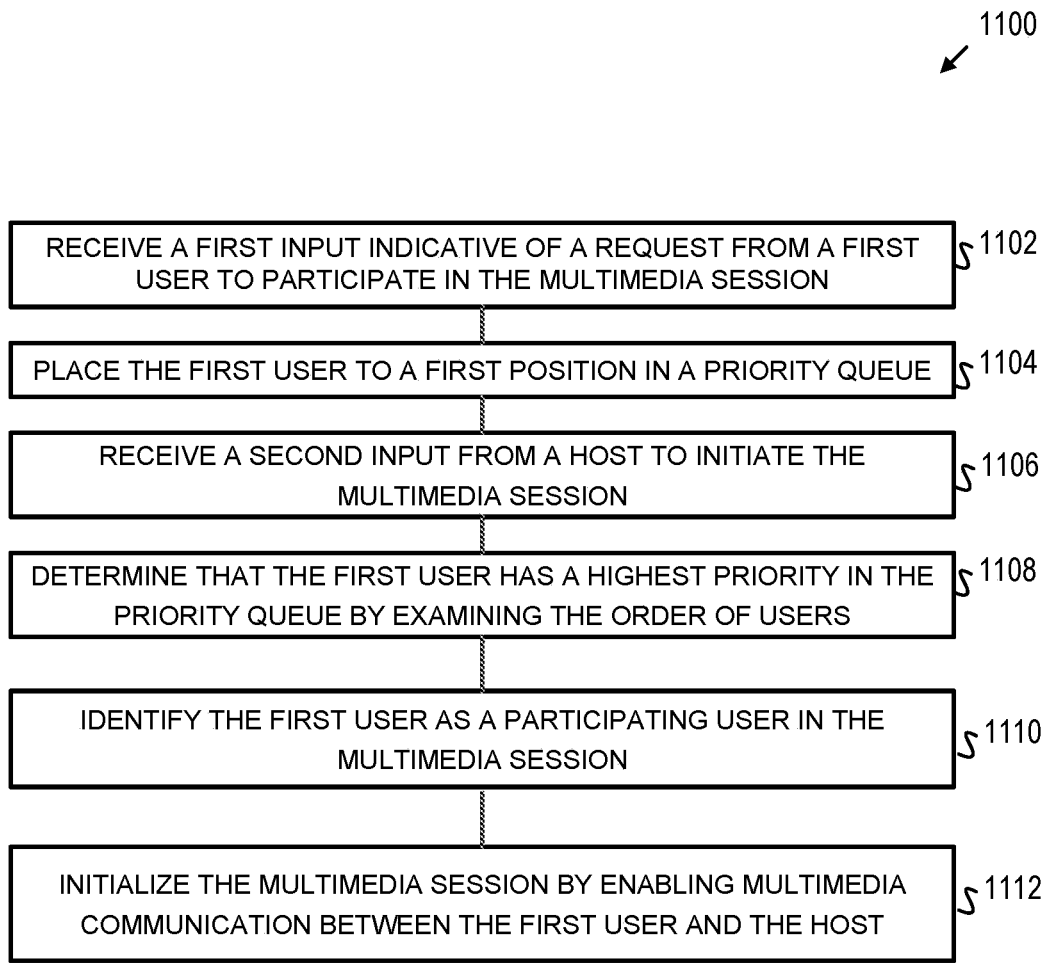
FIG. 11 is a block diagram of a method to facilitate an interactive session between host(s) and participant(s), in accordance with various embodiments, in accordance with various embodiments.

FIG. 11 is a block diagram of a method 1100 to facilitate an interactive session between host(s) and participant(s), in accordance with various embodiments, in accordance with various embodiments. The present method may establish a multimedia session between one or more hosts and one or more users. The multimedia session may facilitate audio, video, text, etc. communication between hosts and users.

The method may include receiving first input indicative of a request from a first user to participate in the multimedia session (block 1102). For example, the first input may be generated responsive to a determination that the first user has selected a digital element (e.g., a button) on an interface accessible through a computer program, such as a mobile application or a web browser. Upon selecting the digital element, the first user may be guided to an interactive session or a waiting room, as discussed above with respect to FIG. 6. As another example, the first input may be generated responsive to a determination that the first user has initiated a computer program through which the first user can observe the interactive session.

The method may include placing the first user in a first position in the priority queue based on a first timestamp indicative of a time at which the first input was received (block 1104). The priority queue may represent an order of users to be used to select a given user for participation in the multimedia session.

The method may include receiving second input from a second user requesting to participate in the multimedia session. The second input may be received after the first input. In some embodiments, the second user may be placed in a second position in the priority queue. The second position in the priority queue may have a lower priority position than the first position in the priority queue.

In some embodiments, an instruction to terminate an interaction session between the host and the first user as the participating user may be received. This may be indicative of the hosts desiring to end the session with the first user. Multimedia communication from the first user may be disabled. The order of users in the priority queue may be updated by removing the first user from the first position in the priority queue. The second user may then be determined to have the highest priority in the priority queue by examining the updated order of users, where the second user may be identified as the participating user in the multimedia session. Multimedia communication may be enabled between the second user and the host.

In some embodiments, an input from a third user to participate in the multimedia session may be received. A media capture capability of an electronic device may be inspected to be used by the third user to capture multimedia. It may be determined that the media capture capability fails to meet a threshold quality metric. The third user may be prevented from participating in the multimedia session by preventing inclusion in the priority queue until it is determined that the media capture capability meets the threshold quality metric.

In some embodiments, the media capture capability may be representative of audio quality, video quality, or some combination thereof.

In some embodiments, the method may include determining that a second user who requested to participate in the multimedia session has left the multimedia session without participating. The order of users in the priority queue may be updated by removing the second user from the priority queue. Based on the updated order of users, each user beneath the second user in the priority queue may be elevated.

The method may include receiving a request from the host to initiate the multimedia session (block 1106). Prior to receiving this request, the hosts may be in a green room and the users may be in a waiting room as described herein. The method may include displaying a first intermediary interface to the host that enables audio and video streams associated with the host displaying a second intermediary interface to the first user that enables only audio and video streams associated with the first user on the second intermediary interface.

The method may include determining that a first user has a highest priority in the priority queue by an examining an order of users (block 1108). The method may include identifying the first user as a participating user (block 1110). The first user may be identified as the participating user based on the first user having the greatest priority in the priority queue. The first user may be identified as the participating user based on a selection of the first user by a host/managing observer.

In some embodiments, the method may include inspecting video and audio streams associated with any of the first user and/or second user with a series of rules to determine whether the first user/second user are in accordance with the series of rules.

In some embodiments, a first steam of multimedia content may be compared with a series of rules to determine whether the first user is in compliance with the series of rules. Based on this determination, the priority queue may be managed based on whether the first user is in compliance with the series of rules. The first user may be permitted to maintain a position in the priority queue responsive to a determination that the first user is in compliance with the series of rules. The first user may be lowered in the priority queue, or removed from the priority queue entirely, responsive to a determination that the first user is not in compliance with the series of rules.

The method may include initializing the multimedia session by enabling multimedia communication between the first user and the host (block 1112). Enabling multimedia communication between the first user and the host may allow for the first user as the participating user and the host to directly communicate in the multimedia session, while non-participating users may view the communication.

In some embodiments, initializing the multimedia session may cause display of a first stream of multimedia content that is captured by a first electronic device associated with the first user on a network-accessible interface and cause display of a second stream of multimedia content that is captured by a second electronic device associated with the host on the network-accessible interface.

In some embodiments, the multimedia session may include an interface with multiple portions. The interface may include a first portion in which a video stream associated with the host is displayed. The interface may include a second portion in which a video stream associated with the first user is displayed. The interface may include a third portion in which video streams associated with a first set of non-participating users having lower priority than the first user are displayed. The interface may include a fourth portion in which a list of identifiers associated with a second set of non-participating users having lower priority than the first set of non-participating users is displayed.

In some embodiments, the method may include initializing a community message board to be displayed during the multimedia session. The community message board may be configured to display messages received from any host, the participating user, and any non-participating user.

Figure 12A:
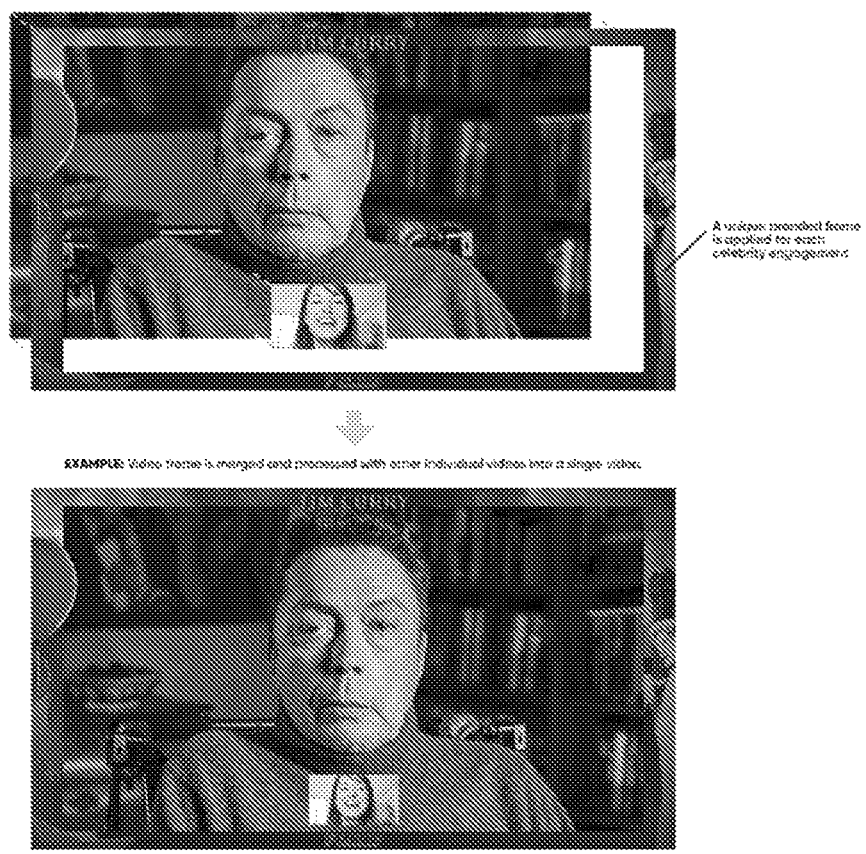
FIG. 12A illustrates how, in some embodiments, a digital frame (also referred to as a "digital border") is applied to video content associated with a multimedia session by a session management platform.
Figure 12B:
FIG. 12B illustrates how a digital frame could also be applied to an image associated with a multimedia session by the session management platform.

FIG. 12A illustrates how, in some embodiments, a digital frame (also referred to as a "digital border") is applied to video content associated with a multimedia session by a session management platform. In some embodiments, the session management platform applies the digital frame to each frame in the video content in real time (i.e., as the video content is streamed for viewing). In other embodiments, the session management platform applies the digital frame to each frame in the video content during post processing. In such embodiments, the streamed video content will not be accompanied by the digital frame though the recording of the streamed video content will be accompanied by the digital frame. FIG. 12B, meanwhile, illustrates how a digital frame could also be applied to an image associated with a multimedia session by the session management platform. The digital frame may be designed based on the host of the multimedia session. For example, the digital frame may include scenes from movies the host has acted in, images of albums the host has recorded, images of the host himself/herself, etc.

Figure 13A:
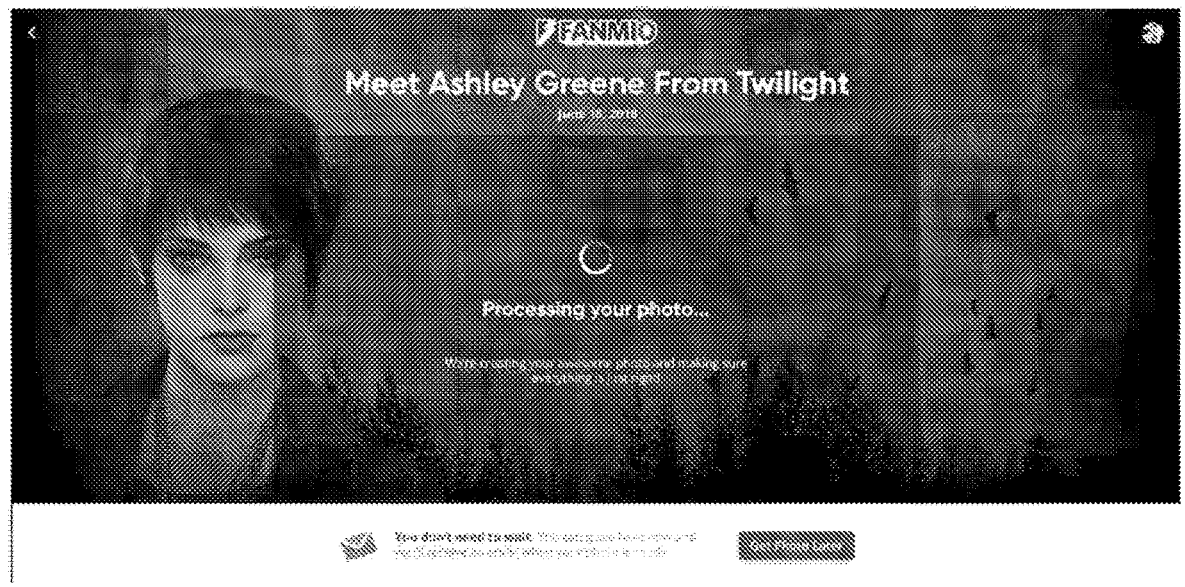
FIGS. 13A-C illustrate how images with digital frames may be created following a multimedia session.
Figure 13B:
Figure 13C:

FIGS. 13A-C illustrate how images with digital frames may be created following a multimedia session. After leaving the multimedia session, users who participated in the multimedia session may be prompted to specify whether they want a photo to commemorate the experience. If a user indicates that she wants a photo to be created, the session management platform can create the photo by appending a digital frame to an image as shown in FIG. 12B. The image may be representative of a single frame in the video content captured during the multimedia session. For example, a host may select a user to participate in a back-and-forth exchange during the multimedia session. Following the multimedia session, an instance in which the user and the host were conversing can be identified (e.g., by the user or session management platform), and the session management platform may generate an image that includes a frame of the video streamed by the host and a frame of the video streamed by the user and then append the digital frame to the image.

Thereafter, the session management platform may provide the framed image directly to the user (e.g., in the form of a downloadable file) and/or allow the user to share the framed image on a social networking platform. Here, for example, the session management platform includes options for sharing the framed image on Facebook®, Twitter®, and Facebook Messenger®. In some embodiments the user is permitted to share the framed image itself via these social networking platforms, while in other embodiments the user is permitted to share a link to the framed image. When another person selects the link, she may be directed to an interface (e.g., a website) that is generated by the session management platform.

Figure 14A:
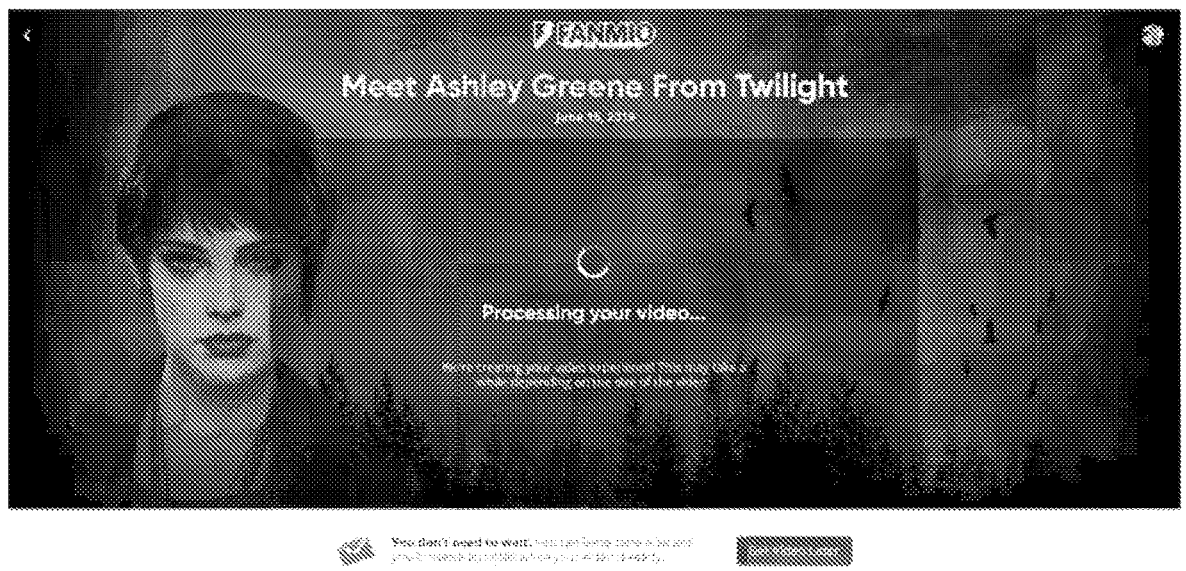
FIGS. 14A-C illustrate how videos with digital frames may be created following a multimedia session.
Figure 14B:
Figure 14C:

FIGS. 14A-C illustrate how videos with digital frames may be created following a multimedia session in a similar manner. While the process for creating framed videos is similar to the process discussed above with respect to FIGS. 13A-C, a video is representative of a small segment of the multimedia session rather than a single instance. Thus, the video may correspond to the entire portion of the multimedia session in which the user is participating, or the video may correspond to a smaller portion of the multimedia session in which the user has asked a particular question. For example, the user may be interested in sharing a portion of the multimedia session in which she asked an interesting question and the host provided an interesting response.

Processing System

Figure 15:
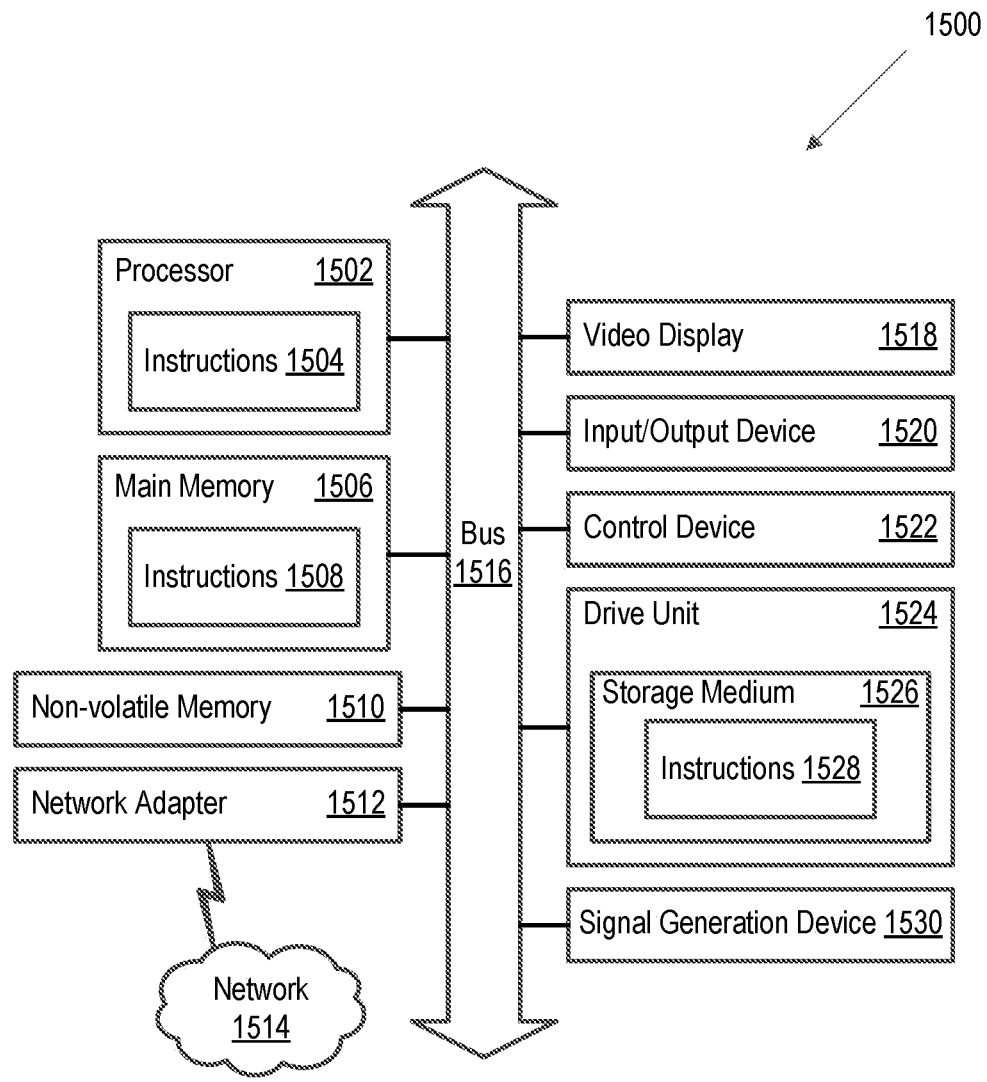
FIG. 15 is a block diagram illustrating an example of a processing system in which at least some operations described herein can be implemented.

FIG. 15 is a block diagram illustrating an example of a processing system 1500 in which at least some operations described herein can be implemented. For example, some components of the processing system 1500 may be hosted on an electronic device that includes a session management platform (e.g., session management platform 122 of FIG. 1). As another example, some components of the processing system 1500 may be hosted on an electronic device configured to generate digital media.

The processing system 1500 may include one or more central processing units ("processors") 1502, main memory 151006, non-volatile memory 1510, network adapter 1512 (e.g., network interface), video display 1518, input/output devices 1520, control device 1522 (e.g., keyboard and pointing devices), drive unit 1524 including a storage medium 1526, and signal generation device 1530 that are communicatively connected to a bus 1516. The bus 1516 is illustrated as an abstraction that represents one or more physical buses and/or point-to-point connections that are connected by appropriate bridges, adapters, or controllers. The bus 1516, therefore, can include a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus (also referred to as "Firewire").

The processing system 1500 may share a similar computer processor architecture as that of a desktop computer, tablet computer, personal digital assistant (PDA), mobile phone, game console, music player, wearable electronic device (e.g., a watch or fitness tracker), network-connected ("smart") device (e.g., a television or home assistant device), virtual/augmented reality systems (e.g., a head-mounted display), or another electronic device capable of executing a set of instructions (sequential or otherwise) that specify action(s) to be taken by the processing system 1500.

While the main memory 1506, non-volatile memory 1510, and storage medium 1526 (also called a "machine-readable medium") are shown to be a single medium, the term "machine-readable medium" and "storage medium" should be taken to include a single medium or multiple media (e.g., a centralized/distributed database and/or associated caches and servers) that store one or more sets of instructions 1528. The term "machine-readable medium" and "storage medium" shall also be taken to include any medium that is capable of storing, encoding, or carrying a set of instructions for execution by the processing system 1500.

In general, the routines executed to implement the embodiments of the disclosure may be implemented as part of an operating system or a specific application, component, program, object, module, or sequence of instructions (collectively referred to as "computer programs"). The computer programs typically comprise one or more instructions (e.g., instructions 1504, 1508, 1528) set at various times in various memory and storage devices in a computing device. When read and executed by the one or more processors 1502, the instruction(s) cause the processing system 1500 to perform operations to execute elements involving the various aspects of the disclosure.

Moreover, while embodiments have been described in the context of fully functioning computing devices, those skilled in the art will appreciate that the various embodiments are capable of being distributed as a program product in a variety of forms. The disclosure applies regardless of the particular type of machine or computer-readable media used to actually effect the distribution.

Further examples of machine-readable storage media, machine-readable media, or computer-readable media include recordable-type media such as volatile and non-volatile memory devices 1510, floppy and other removable disks, hard disk drives, optical disks (e.g., Compact Disk Read-Only Memory (CD-ROMS), Digital Versatile Disks (DVDs)), and transmission-type media such as digital and analog communication links.

The network adapter 1512 enables the processing system 1500 to mediate data in a network 1514 with an entity that is external to the processing system 1500 through any communication protocol supported by the processing system 1500 and the external entity. The network adapter 1512 can include a network adaptor card, a wireless network interface card, a router, an access point, a wireless router, a switch, a multilayer switch, a protocol converter, a gateway, a bridge, bridge router, a hub, a digital media receiver, and/or a repeater.

The network adapter 1512 may include a firewall that governs and/or manages permission to access/proxy data in a computer network and tracks varying levels of trust between different machines and/or applications. The firewall can be any number of modules having any combination of hardware and/or software components able to enforce a predetermined set of access rights between a particular set of machines and applications, machines and machines, and/or applications and applications (e.g., to regulate the flow of traffic and resource sharing between these entities). The firewall may additionally manage and/or have access to an access control list that details permissions including the access and operation rights of an object by an individual, a machine, and/or an application, and the circumstances under which the permission rights stand.

The techniques introduced here can be implemented by programmable circuitry (e.g., one or more microprocessors), software and/or firmware, special-purpose hardwired (i.e., non-programmable) circuitry, or a combination of such forms. Special-purpose circuitry can be in the form of one or more application-specific integrated circuits (ASICs), programmable logic devices (PLDs), field-programmable gate arrays (FPGAs), etc.

Remarks

The foregoing description of various embodiments of the claimed subject matter has been provided for the purposes of illustration and description. It is not intended to be exhaustive or to limit the claimed subject matter to the precise forms disclosed. Many modifications and variations will be apparent to one skilled in the art. Embodiments were chosen and described in order to best describe the principles of the invention and its practical applications, thereby enabling those skilled in the relevant art to understand the claimed subject matter, the various embodiments, and the various modifications that are suited to the particular uses contemplated.

Although the Detailed Description describes certain embodiments and the best mode contemplated, the technology can be practiced in many ways no matter how detailed the Detailed Description appears. Embodiments may vary considerably in their implementation details, while still being encompassed by the specification. Particular terminology used when describing certain features or aspects of various embodiments should not be taken to imply that the terminology is being redefined herein to be restricted to any specific characteristics, features, or aspects of the technology with which that terminology is associated. In general, the terms used in the following claims should not be construed to limit the technology to the specific embodiments disclosed in the specification, unless those terms are explicitly defined herein. Accordingly, the actual scope of the technology encompasses not only the disclosed embodiments, but also all equivalent ways of practicing or implementing the embodiments.

The language used in the specification has been principally selected for readability and instructional purposes. It may not have been selected to delineate or circumscribe the subject matter. It is therefore intended that the scope of the technology be limited not by this Detailed Description, but rather by any claims that issue on an application based hereon. Accordingly, the disclosure of various embodiments is intended to be illustrative, but not limiting, of the scope of the technology as set forth in the following claims.

What is claimed is:

1. A computer-implemented method comprising:
    receiving a first input indicative of a request from a first user to participate in a multimedia session;
    placing the first user in a first position in a priority queue based on a first timestamp indicative of a time at which the first input is received,
        wherein the priority queue represents an order of users to be used to select a given user for participation in the multimedia session, and
        wherein the users are,
        (i) not assigned dedicated intervals of time prior to the multimedia session, and
        (ii) not allocated predetermined amounts of time for participation in the multimedia session;
    receiving a second input indicative of a request from a second user to participate in the multimedia session;
    placing the second user in a second position in the priority queue based on a second timestamp indicative of a time at which the second input is received,
        wherein the second position is lower in the priority queue than the first position, thereby indicating that the second user has a lower priority than the first user;
    receiving a third input indicative of a request from a host to initiate the multimedia session;
    determining that the first user has a highest priority in the priority queue by examining the order of users;
    identifying the first user as a participating user in the multimedia session;
    initializing the multimedia session by enabling multimedia communication between the first user and the host by
        causing display of a first stream of multimedia content that is captured by a first electronic device associated with the first user in a first portion of a network-accessible interface, and
        causing display of a second stream of multimedia content that is captured by a second electronic device associated with the host in a second portion of the network-accessible interface,
    wherein the network-accessible interface further includes—
        a third portion in which video streams associated with a first set of non-participating users having lower priority than the first user are displayed, and a fourth portion in which a list of identifiers associated with a second set of non-participating users having lower priority than the first set of non-participating users is displayed;
receiving an instruction to terminate an interaction session between the host and the first user as the participating user;
disabling multimedia communication from the first user;
updating the order of users in the priority queue by removing the first user from the first position in the priority queue;
determining that the second user has the highest priority in the priority queue by examining the updated order of users;
identifying the second user as the participating user in the multimedia session;
enabling multimedia communication between the second user and the host;
receiving a fourth input indicative of a request from a third user to participate in the multimedia session;
inspecting a media capture capability of a third electronic device to be used by the third user to capture multimedia;
determining that the media capture capability fails to meet a threshold quality metric; and
preventing the third user from participating in the multimedia session by preventing inclusion in the priority queue until it is determined that the media capture capability meets the threshold quality metric;
inspecting a media capture capability of an electronic device used by the first, second or any other user upon receiving a request from said first, second or any other user to participate in the multimedia session;
determining that the media capture capability fails to meet a threshold quality metric; and
preventing the first, second or any other user from participating in the multimedia session by preventing inclusion in the priority queue until it is determined that the media capture capability meets the threshold quality metric.

2. A computer-implemented method comprising:
receiving a first input indicative of a request from a first user to participate in a multimedia session;
placing the first user in a first position in a priority queue based on a first timestamp indicative of a time at which the first input is received,
wherein the priority queue represents an order of users to be used to select a given user for participation in the multimedia session, and
wherein the users are,
(i) assigned dedicated intervals of time prior to the multimedia session, and (ii) allocated predetermined amounts of time for participation in the multimedia session;
receiving a second input indicative of a request from a second user to participate in the multimedia session;
placing the second user in a second position in the priority queue based on a second timestamp indicative of a time at which the second input is received,
wherein the second position is lower in the priority queue than the first position, thereby indicating that the second user has a lower priority than the first user;
receiving a third input indicative of a request from a host to initiate the multimedia session;
determining that the first user has a highest priority in the priority queue by examining the order of users;
identifying the first user as a participating user in the multimedia session;
initializing the multimedia session by enabling multimedia communication between the first user and the host by
causing display of a first stream of multimedia content that is captured by a first electronic device associated with the first user in a first portion of a network-accessible interface, and
causing display of a second stream of multimedia content that is captured by a second electronic device associated with the host in a second portion of the network-accessible interface,
wherein the network-accessible interface further includes—
a third portion in which video streams associated with a first set of non-participating users having lower priority than the first user are displayed, and
a fourth portion in which a list of identifiers associated with a second set of non-participating users having lower priority than the first set of non-participating users is displayed;
receiving an instruction to terminate an interaction session between the host and the first user as the participating user;
disabling multimedia communication from the first user;
updating the order of users in the priority queue by removing the first user from the first position in the priority queue;
determining that the second user has the highest priority in the priority queue by examining the updated order of users;
identifying the second user as the participating user in the multimedia session;
enabling multimedia communication between the second user and the host;
receiving a fourth input indicative of a request from a third user to participate in the multimedia session;
inspecting a media capture capability of a third electronic device to be used by the third user to capture multimedia;
determining that the media capture capability fails to meet a threshold quality metric; and
preventing the third user from participating in the multimedia session by preventing inclusion in the priority queue until it is determined that the media capture capability meets the threshold quality metric;
inspecting a media capture capability of an electronic device used by the first, second or any other user to capture multimedia upon receiving a request from said first, second or any other user to participate in the multimedia session;
determining that the media capture capability fails to meet a threshold quality metric; and
preventing the first, second or any other user from participating in the multimedia session by preventing inclusion in the priority queue until it is determined that the media capture capability meets the threshold quality metric.

3. A computer-implemented method comprising:
receiving a first input indicative of a request from a first user to participate in a multimedia session;
placing the first user in a first position in a priority queue based on a first timestamp indicative of a time at which the first input is received, wherein the priority queue represents an order of users to be used to select a given user for participation in the multimedia session, and
wherein the users are,
(i) assigned dedicated intervals of time prior to the multimedia session, and (ii) not allocated predetermined amounts of time for participation in the multimedia session;
receiving a second input indicative of a request from a second user to participate in the multimedia session;
placing the second user in a second position in the priority queue based on a second timestamp indicative of a time at which the second input is received,
wherein the second position is lower in the priority queue than the first position, thereby indicating that the second user has a lower priority than the first user;
receiving a third input indicative of a request from a host to initiate the multimedia session;
determining that the first user has a highest priority in the priority queue by examining the order of users;
identifying the first user as a participating user in the multimedia session;
initializing the multimedia session by enabling multimedia communication between the first user and the host by
causing display of a first stream of multimedia content that is captured by a first electronic device associated with the first user in a first portion of a network-accessible interface, and
causing display of a second stream of multimedia content that is captured by a second electronic device associated with the host in a second portion of the network-accessible interface,
wherein the network-accessible interface further includes—
a third portion in which video streams associated with a first set of non-participating users having lower priority than the first user are displayed, and
a fourth portion in which a list of identifiers associated with a second set of non-participating users having lower priority than the first set of non-participating users is displayed;
receiving an instruction to terminate an interaction session between the host and the first user as the participating user;
disabling multimedia communication from the first user;
updating the order of users in the priority queue by removing the first user from the first position in the priority queue;
determining that the second user has the highest priority in the priority queue by examining the updated order of users;
identifying the second user as the participating user in the multimedia session;
enabling multimedia communication between the second user and the host;
receiving a fourth input indicative of a request from a third user to participate in the multimedia session;
inspecting a media capture capability of a third electronic device to be used by the third user to capture multimedia;
determining that the media capture capability fails to meet a threshold quality metric; and
preventing the third user from participating in the multimedia session by preventing inclusion in the priority queue until it is determined that the media capture capability meets the threshold quality metric;
inspecting a media capture capability of an electronic device used by the first, second or any other user upon receiving a request from said first, second or any other user to participate in the multimedia session;
determining that the media capture capability fails to meet a threshold quality metric; and
preventing the first, second or any other user from participating in the multimedia session by preventing inclusion in the priority queue until it is determined that the media capture capability meets the threshold quality metric.

4. A computer-implemented method comprising:
receiving a first input indicative of a request from a first user to participate in a multimedia session;
placing the first user in a first position in a priority queue based on a first timestamp indicative of a time at which the first input is received,
wherein the priority queue represents an order of users to be used to select a given user for participation in the multimedia session, and
wherein the users are,
(i) not assigned dedicated intervals of time prior to the multimedia session, and
(ii) allocated predetermined amounts of time for participation in the multimedia session;
receiving a second input indicative of a request from a second user to participate in the multimedia session;
placing the second user in a second position in the priority queue based on a second timestamp indicative of a time at which the second input is received,
wherein the second position is lower in the priority queue than the first position, thereby indicating that the second user has a lower priority than the first user;
receiving a third input indicative of a request from a host to initiate the multimedia session;
determining that the first user has a highest priority in the priority queue by examining the order of users;
identifying the first user as a participating user in the multimedia session;
initializing the multimedia session by enabling multimedia communication between the first user and the host by
causing display of a first stream of multimedia content that is captured by a first electronic device associated with the first user in a first portion of a network-accessible interface, and
causing display of a second stream of multimedia content that is captured by a second electronic device associated with the host in a second portion of the network-accessible interface,
wherein the network-accessible interface further includes—
a third portion in which video streams associated with a first set of non-participating users having lower priority than the first user are displayed, and
a fourth portion in which a list of identifiers associated with a second set of non-participating users having lower priority than the first set of non-participating users is displayed;
receiving an instruction to terminate an interaction session between the host and the first user as the participating user;
disabling multimedia communication from the first user;

updating the order of users in the priority queue by removing the first user from the first position in the priority queue;

determining that the second user has the highest priority in the priority queue by examining the updated order of users;

identifying the second user as the participating user in the multimedia session;

enabling multimedia communication between the second user and the host;

receiving a fourth input indicative of a request from a third user to participate in the multimedia session;

inspecting a media capture capability of a third electronic device to be used by the third user to capture multimedia;

determining that the media capture capability fails to meet a threshold quality metric; and preventing the third user from participating in the multimedia session by preventing inclusion in the priority queue until it is determined that the media capture capability meets the threshold quality metric;

inspecting a media capture capability of an electronic device used by the first, second or any other user upon receiving a request from said first, second or any other user to participate in the multimedia session;

determining that the media capture capability fails to meet a threshold quality metric; and preventing the first, second or any other user from participating in the multimedia session by preventing inclusion in the priority queue until it is determined that the media capture capability meets the threshold quality metric.

5. The computer-implemented method of claims 1, 2, 3 or 4 wherein the media capture capability is representative of audio quality, video quality, or some combination thereof.

* * * * *